US012142417B2

(12) United States Patent
Adachi et al.

(10) Patent No.: US 12,142,417 B2
(45) Date of Patent: Nov. 12, 2024

(54) IGNITION COIL FOR INTERNAL COMBUSTION ENGINE

(71) Applicant: DENSO CORPORATION, Kariya (JP)

(72) Inventors: Norihiro Adachi, Kariya (JP); Kanechiyo Terada, Kariya (JP); Tetsuya Miwa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/449,742

(22) Filed: Aug. 15, 2023

(65) Prior Publication Data

US 2023/0395318 A1 Dec. 7, 2023

Related U.S. Application Data

(63) Continuation of application No. 18/071,957, filed on Nov. 30, 2022, now Pat. No. 11,769,627, which is a (Continued)

(30) Foreign Application Priority Data

Mar. 26, 2019 (JP) ................................ 2019-058801

(51) Int. Cl.

| | |
|---|---|
| ***H01F 38/12*** | (2006.01) |
| ***F02P 3/02*** | (2006.01) |
| ***F02P 13/00*** | (2006.01) |

(52) U.S. Cl.

CPC ................ *H01F 38/12* (2013.01); *F02P 3/02* (2013.01); *F02P 13/00* (2013.01); *H01F 2038/122* (2013.01)

(58) Field of Classification Search

CPC ...... H01F 38/12; H01F 2038/122; F01P 3/02; F02P 13/00

See application file for complete search history.

(56) References Cited

U.S. PATENT DOCUMENTS

| | | |
|---|---|---|
| 5,764,124 A | 6/1998 | Nakamichi |
| 11,367,567 B2 | 6/2022 | Adachi et al. |

(Continued)

FOREIGN PATENT DOCUMENTS

| | | |
|---|---|---|
| JP | 2012-64620 | 3/2012 |
| JP | 2015-200284 | 11/2015 |

(Continued)

OTHER PUBLICATIONS

U.S. Appl. No. 18/071,957, filed Nov. 30, 2022, Ignition Coil for Internal Combustion Engine.

(Continued)

*Primary Examiner* — Jacob M Amick
(74) *Attorney, Agent, or Firm* — Nixon & Vanderhye P.C.

(57) ABSTRACT

An ignition coil for an internal combustion engine includes a primary bobbin including a winding cylinder part and a connection part between the winding cylinder part and a connector part, a primary coil including a primary main coil and a primary sub coil, and a secondary coil. When one of the primary main coil and the primary sub coil that includes an innermost coil part around the winding cylinder part is defined as a firstly-wound coil and the other is defined as a secondly-wound coil, firstly-wound ends, which are ends of the firstly-wound coil, and secondly-wound ends, which are ends of the secondly-wound coil, are attached to the connection part, and a shortest distance from a central axis of the winding cylinder part to each of the firstly-wound ends is smaller than a shortest distance from the central axis of the winding cylinder part to each of the secondly-wound ends.

1 Claim, 22 Drawing Sheets

Related U.S. Application Data continuation of application No. 17/747,024, filed on May 18, 2022, now Pat. No. 11,545,300, which is a continuation of application No. 17/448,741, filed on Sep. 24, 2021, now Pat. No. 11,367,567, which is a continuation of application No. PCT/JP2020/002516, filed on Jan. 24, 2020.

(56) References Cited

U.S. PATENT DOCUMENTS

| | | | | |
|---|---|---|---|---|
| 11,545,300 | B2 | 1/2023 | Adachi | |
| 2011/0259307 | A1 | 10/2011 | Oberer | |
| 2013/0284157 | A1 | 10/2013 | Deguchi | |
| 2016/0160832 | A1 | 6/2016 | Skinner | |
| 2016/0365194 | A1 | 12/2016 | Skinner | |
| 2017/0263375 | A1 | 9/2017 | Akimoto | |
| 2017/0301461 | A1 | 10/2017 | Kato | |
| 2018/0163688 | A1 | 6/2018 | Kawai | |
| 2018/0254144 | A1 | 9/2018 | Kawai | |
| 2019/0120198 | A1 | 4/2019 | Miyake | |
| 2020/0049120 | A1 | 2/2020 | Ohno | |
| 2021/0265107 | A1* | 8/2021 | Suzuki | F02P 3/02 |
| 2022/0013283 | A1 | 1/2022 | Adachi et al. | |
| 2022/0277894 | A1 | 9/2022 | Adachi et al. | |
| 2023/0093588 | A1 | 3/2023 | Adachi | |

FOREIGN PATENT DOCUMENTS

| | | |
|---|---|---|
| JP | 2016-79958 | 5/2016 |
| JP | 2017-199749 | 11/2017 |

OTHER PUBLICATIONS

U.S. Appl. No. 17/747,024, filed May 18, 2022, Ignition Coil for Internal Combustion Engine.

U.S. Appl. No. 17/448,741, filed Sep. 24, 2021, Ignition Coil for Internal Combustion Engine.

* cited by examiner

IGNITION COIL FOR INTERNAL COMBUSTION ENGINE

CROSS-REFERENCE TO RELATED APPLICATION

This application is a continuation of U.S. application Ser. No. 18/071,957, filed Nov. 30, 2022, which is a continuation of U.S. application Ser. No. 17/747,024, filed May 18, 2022, now U.S. Pat. No. 11,545,300, issued Jan. 3, 2023, which is a continuation of U.S. application Ser. No. 17/448,741, filed Sep. 24, 2021, now U.S. Pat. No. 11,367,567, issued Jun. 21, 2022, which is a continuation of International Application No. PCT/JP2020/002516, filed on Jan. 24, 2020 which designated the U.S. and claims the benefit of priority from earlier Japanese Patent Application No. 2019-058801 filed on Mar. 26, 2019, the entire contents of each of which are incorporated herein by reference.

BACKGROUND

Technical Field

The present disclosure relates to an ignition coil for an internal combustion engine.

Related Art

Ignition coils for internal combustion engines are used in engines such as internal combustion engines to generate spark discharge from a spark plug.

SUMMARY

As an aspect of the present disclosure, an ignition coil for an internal combustion engine is provided. The ignition coil includes:

- a primary bobbin made of an insulating material and including a winding cylinder part and a connection part connected to the winding cylinder part and positioned between the winding cylinder part and a connector part;
- a primary coil including a primary main coil and a primary sub coil separately wound around the winding cylinder part; and a secondary coil that is concentric with the primary coil.

When one of the primary main coil and the primary sub coil that includes an innermost coil part around the winding cylinder part is defined as a firstly-wound coil and the other is defined as a secondly-wound coil,

- firstly-wound ends, which are a pair of ends of the firstly-wound coil, and secondly-wound ends, which are a pair of ends of the secondly-wound coil, are attached to the connection part, and
- a shortest distance from a central axis of the winding cylinder part to each of the firstly-wound ends is smaller than a shortest distance from the central axis of the winding cylinder part to each of the secondly-wound ends.

DETAILED DESCRIPTION OF THE PREFERRED EMBODIMENTS

Ignition coils for internal combustion engines are used in engines such as internal combustion engines to generate spark discharge from a spark plug. An ignition coil for an internal combustion engine includes a primary coil which is intermittently energized by an igniter and a secondary coil which generates a high voltage when the dielectric magnetic field, generated when the energization of the primary coil is cut off, is applied thereto. The two coils are concentric with each other. Typically, the primary coil is wound around a resin primary bobbin and the secondary coil is wound around a resin secondary bobbin.

In order to adjust parameters such as the duration of the discharge current after generating the spark discharge and the discharge current value, the primary coil is divided into a plurality of coils, and the energization and interruption of the energization of the coils are controlled. JP 2017-199749 A discloses an example of an ignition coil for an internal combustion engine including such primary coils. It is described in JP 2017-199749 A that two primary coils are wound around the primary bobbin at different positions in the axial direction, and the two ends of each of the coil windings forming the primary coils are fixed to a connection part of the primary bobbin.

However, when the two primary coils are wound around the primary bobbin, there would be a firstly-wound primary coil that is wound first around the primary bobbin and a secondly-wound primary coil that is wound later around the primary bobbin. After the firstly-wound primary coil is wound around the bobbin and the winding ends of the firstly-wound primary coil are fixed to the connection part of the primary bobbin, the secondly-wound primary coil is wound around the bobbin and the winding ends of the secondly-wound primary coil are fixed to the connection part of the primary bobbin.

At this time, depending on the positions in the connection part of the primary bobbin at which the winding ends of the firstly-wound primary coil are fixed, it may be difficult to wind the secondly-wound primary coil around the bobbin, and also it may be difficult to fix the winding ends to the connection part of the primary bobbin. The inventors of the present invention found out that, in order to appropriately fix the winding ends of the two primary coils, the positions at which the winding ends are fixed in the connection part of the primary bobbin should be thought out carefully.

The present disclosure has been obtained in an attempt to provide an ignition coil for an internal combustion engine capable of facilitating the process of attaching two ends of a firstly-wound primary coil and two ends of a secondly-wound primary coil to a connection part of a primary bobbin.

Preferred embodiments of an ignition coil for an internal combustion engine will be described with reference to the drawings.

First Embodiment

Figure 1:
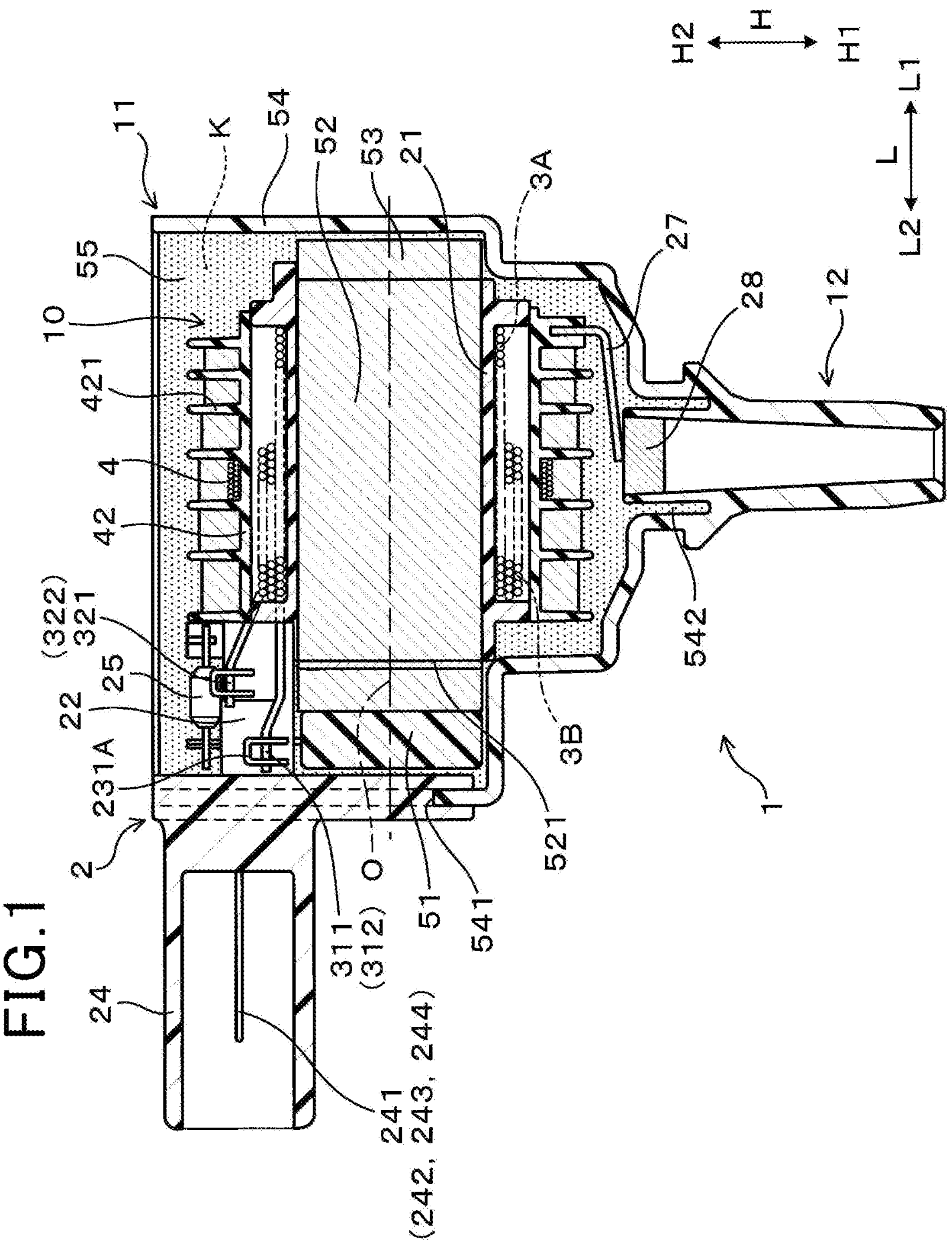
FIG. 1 is an explanatory view showing a cross section of an ignition coil according to a first embodiment.
Figure 2:
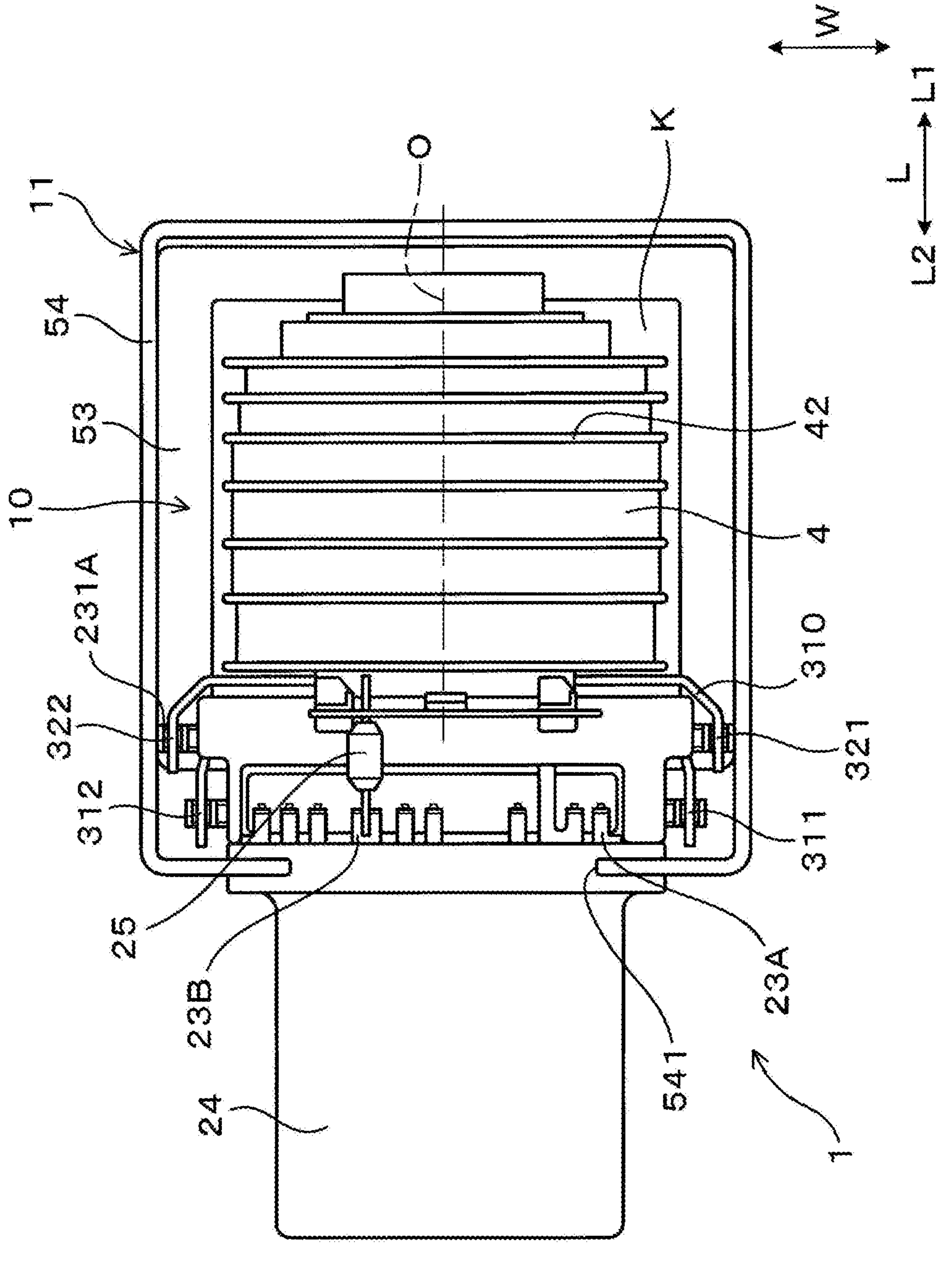
FIG. 2 is a plan view showing constituent elements of the ignition coil according to the first embodiment.
Figure 3:
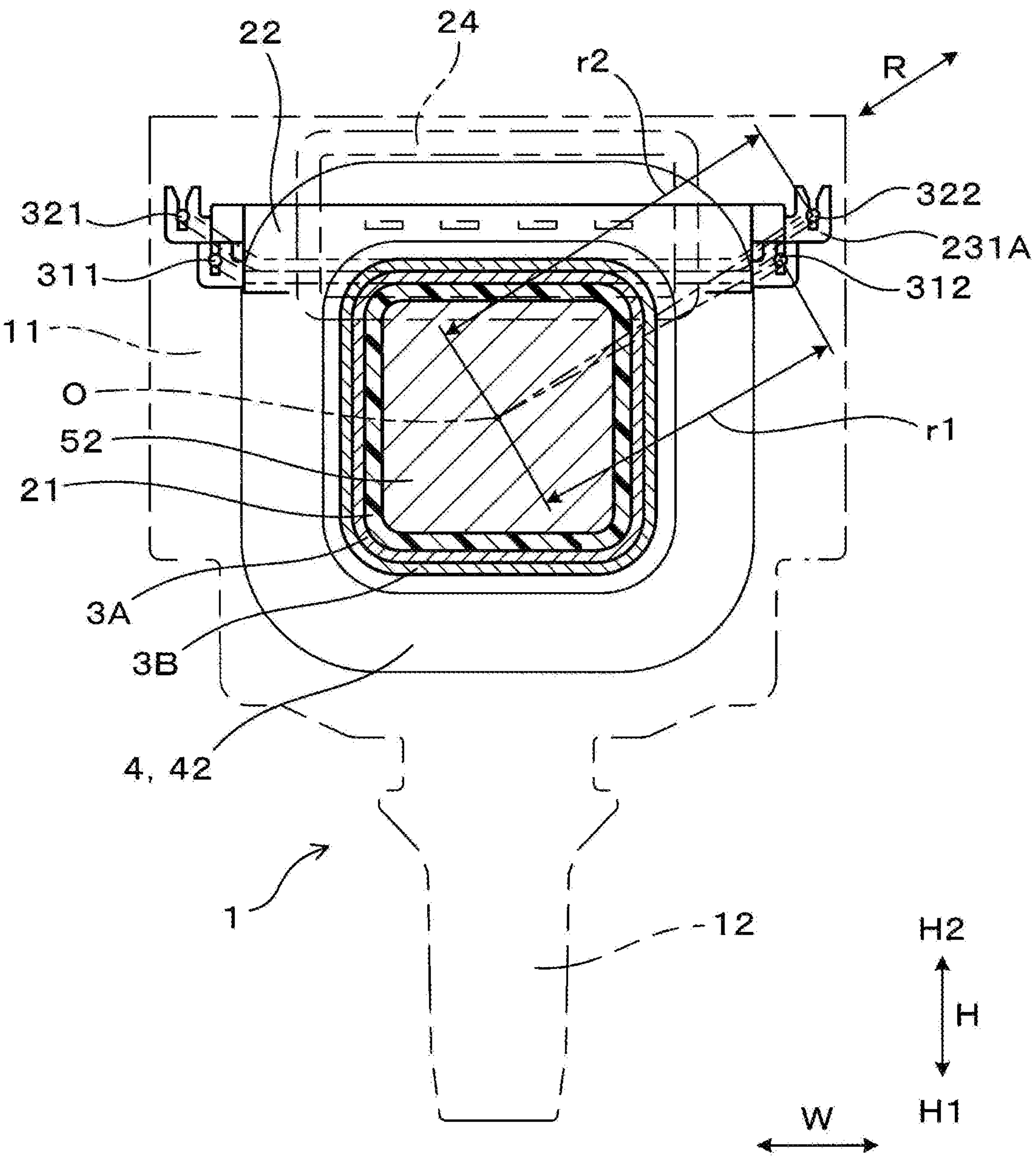
FIG. 3 is an explanatory view schematically showing positions of ends of a primary main coil and a primary sub coil with respect to a central axis of a winding cylinder part according to the first embodiment in a cross section of the ignition coil.

As shown in FIGS. 1 to 3, an ignition coil 1 for an internal combustion engine according to the present embodiment (hereinafter simply referred to as ignition coil 1) includes components such as a primary bobbin 2, a primary coil 3A, 3B, a secondary bobbin 42, and a secondary coil 4. The primary bobbin 2 is made of an insulating material and includes a winding cylinder part 21 and a connection part 22 connected to the winding cylinder part 21 and positioned between the winding cylinder part 21 and a connector part 24. The primary coil 3A, 3B is formed by winding a primary main coil 3A and a primary sub coil 3B separately wound around the outer surface of the winding cylinder part 21. The secondary coil 4 is wound inside slots provided on the outer surface of the secondary bobbin 42, and it is placed around the primary coil 3A, 3B concentrically.

In the ignition coil 1, the one of the primary main coil 3A and the primary sub coil 3B that includes the innermost coil part around the winding cylinder part 21 is referred to as a firstly-wound coil, and the other is referred to as a secondly-wound coil. The term "coil part" refers to a part of the wire, for example, the magnet wire forming the primary main coil 3A or the primary sub coil 3B.

The firstly-wound coil of the present embodiment is formed of the primary main coil 3A, and the secondly-wound coil of the present embodiment is formed of the primary sub coil 3B. Firstly-wound ends 311, 312, which are the two ends of the primary main coil 3A as the firstly-wound coil, and secondly-wound ends 321, 322, which are the two ends of the primary sub coil 3B as the secondly-wound coil, are attached to the connection part 22 of the primary bobbin 2. The shortest distance r1 from the central axis O of the winding cylinder part 21 to the wire center of each firstly-wound end 311, 312 is smaller than the shortest distance r2 from the central axis O of the winding cylinder part 21 to the wire center of each secondly-wound end 321, 322.

The "central axis O of the winding cylinder part 21" refers to an imaginary line passing through the centroid of each of the cross sections of the different parts of the winding cylinder part 21 in the axial direction L. The "shortest distance r1, r2" refers to the distance from the central axis O in the radial direction R of the winding cylinder part 21 in a cross section orthogonal to the axial direction L of the winding cylinder part 21.

The ignition coil 1 of the present embodiment will now be described.

(Ignition Coil 1)

Figure 4:
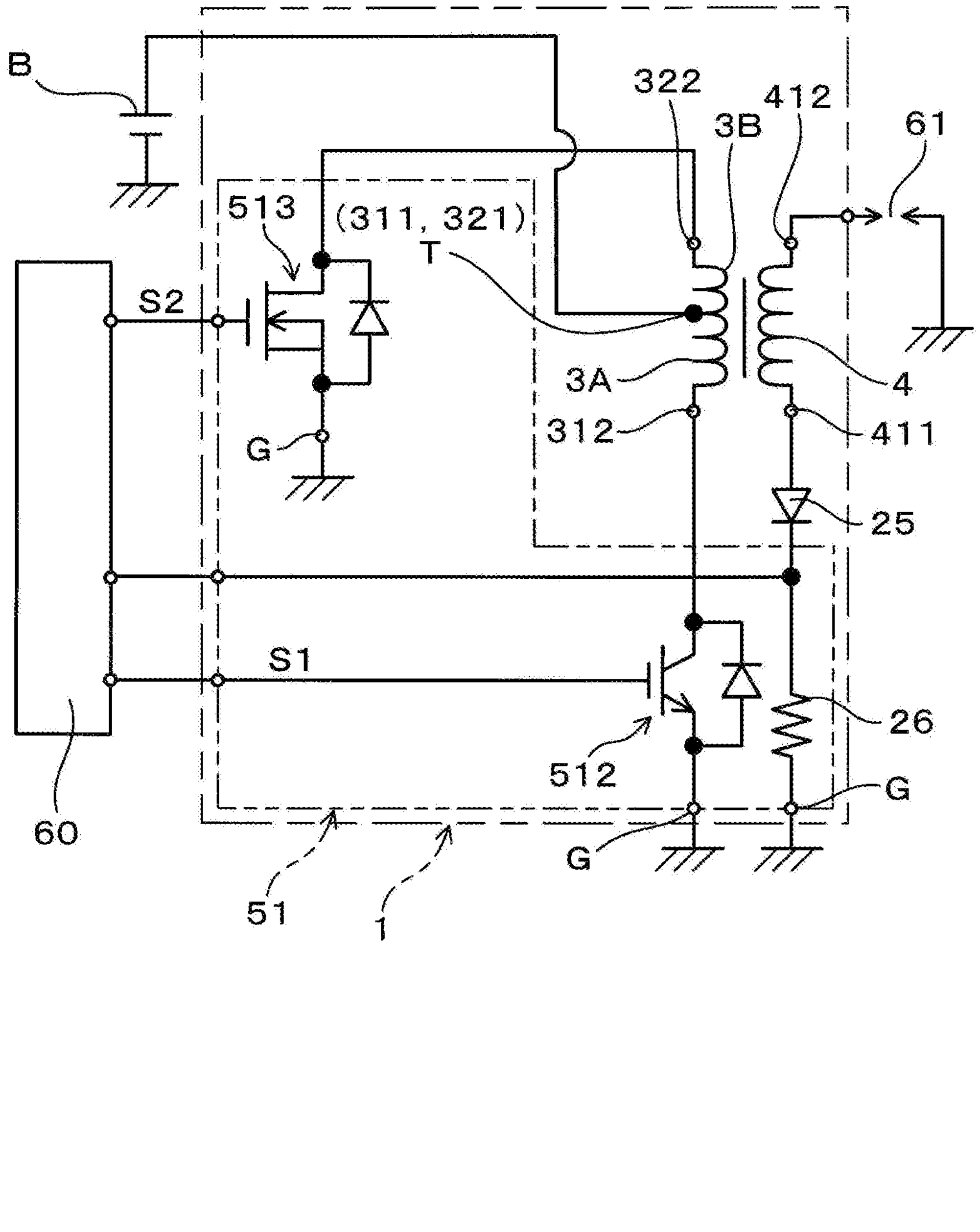
FIG. 4 is an explanatory view schematically showing an example of a control circuit of the ignition coil according to the first embodiment.

As shown in FIGS. 1, 2, and 4, the ignition coil 1 is attached to a cylinder head cover in an engine as an internal combustion engine of a vehicle, and is used to generate spark discharge in a combustion chamber of the cylinder head from a spark plug 61 attached to the cylinder head. The ignition coil 1 of the present embodiment is an ignition coil to be used in vehicles. The ignition coil 1 includes a coil main body part 11 including components such as the primary bobbin 2, primary coils 3A and 3B, secondary bobbin 42, secondary coil 4, and a control circuit, and a tower part 12 protruding from the coil main body 11 and electrically connected to the spark plug 61 via a connecting member. The coil main body part 11 is placed in the cylinder head cover, and the tower part 12 is positioned so that it is pointed toward a plug hole of the cylinder head cover. The tower part 12 is connected to a connecting member (not shown) in a plug hole. This connecting member is attached to the spark plug 61 also in the plug hole.

(Axial Direction L, Lateral Direction W, Height Direction H, Radial Direction R, etc.)

As shown in FIGS. 1 to 3, in the ignition coil 1 of the present embodiment, the direction parallel to the central axis O of the winding cylinder part 21, in other words, the direction in which the central axis O of the primary coils 3A, 3B and the secondary coil 4 arranged concentrically with each other extends is referred to as the axial direction L. The direction that is orthogonal to the axial direction L and in which the coil main body part 11 and the tower part 12 are aligned is referred to as the height direction H. The direction orthogonal to both the axial direction L and the height direction H, in other words, the direction in which the firstly-wound ends 311, 312 of the primary main coil 3A and the secondly-wound ends 321, 322 of the primary sub coil 3B are separated is referred to as the lateral direction W. Further, the directions spreading radially from the central axis O of the winding cylinder part 21 are referred to as the radial directions R.

The central axis of the tower part 12 of the present embodiment, which is an imaginary line, extends in the height direction H and is at right angles to the central axis O of the coil main body part 11. Further, in the axial direction L of the ignition coil 1, the side on which a high-voltage winding end 412 of the secondary coil 4 is located is referred to as the high voltage side L1, and the side on which a low-voltage winding end 411 of the secondary coil 4 is located is referred to as the low voltage side L2. In the height direction H of the ignition coil 1, the side on which the tower part 12 is formed with respect to the coil main body part 11, in other words, the deeper side of the plug hole of the cylinder head cover into which the tower part 12 is inserted is referred to as the deeper side H1, whereas the side opposite to the deeper side H1 is referred to as the opening side H2.

(Energization Timing of Primary Main Coil 3A and Primary Sub Coil 3B)

In the ignition coil 1 of the present embodiment, the primary coil 3A, 3B is divided into two parts, the primary main coil 3A and the primary sub coil 3B, so that the ignition coil 1 can generate a spark in various forms or modes. In the control device of the ignition coil 1, the timing of energizing the primary main coil 3A and the timing of energizing the primary sub coil 3B can be set as appropriate.

The primary main coil 3A is used to form main energy for generating high voltage in the secondary coil 4. The primary sub coil 3B is used to supplement the energy for spark discharge provided by the primary main coil 3A.

In the present embodiment, the timing to start energizing the primary sub coil 3B can be at the time the energization of the primary main coil 3A is cut off or after the energization of the primary main coil 3A is cut off. The timing to start energizing the primary sub coil 3B and the timing to cut off the energization can be set at various other timings.

In the ignition coil 1, the direction of the winding of the winding part 30 of the primary main coil 3A and the direction of the winding of the winding part 30 of the primary sub coil 3B may be the same or opposite. The direction of the magnetic flux generated in the central core 52 by cutting off the energization of the primary main coil 3A and the direction of the magnetic flux generated in the central core 52 by cutting off the energization of the primary sub coil 3B may be the same or opposite.

By appropriately adjusting parameters such as the timing to start energizing the primary main coil 3A and the timing to interrupt the energization, the timing to start energizing the primary sub coil 3B and the timing to interrupt the energization, and the number of times, the state of the current discharged from the spark plug 61 can be changed as appropriate by the secondary coil 4.

The amount of current supplied to the primary main coil 3A can be adjusted to adjust the peak value of the current discharged from the spark plug 61 by the secondary coil 4. The way the primary sub coil 3B is energized can be adjusted to adjust the discharge time of the current discharged from the spark plug 61. The ways to energize the primary sub coil 3B include adjusting the timing to start energizing the primary sub coil 3B so as to increase the current discharge from the spark plug 61, adjusting the timing to stop energizing the primary sub coil 3B so as to reduce the current discharge from the spark plug 61 or control it to a set value, and adjusting the timing to start energizing the primary sub coil 3B and the timing to stop the energization.

(Control Circuit)

FIG. 4 schematically shows an example of a control circuit constructed in an igniter 51 of the ignition coil, 1 which is configured in the control device of the ignition coil 1. The igniter 51 provided with the control circuit is placed in the coil main body part 11 of the ignition coil 1. The igniter 51 includes a first switching element 512 for energizing and cutting off the energization of the primary main coil 3A, and a second switching element 513 for energizing and cutting off the energization of the primary sub coil 3B.

An electronic control unit (ECU) 60 of the vehicle is electrically connected to the igniter 51. The electronic control device 60 sends to the igniter 51 a first ignition signal S1 for generating a spark by the primary main coil 3A and a second ignition signal S2 for continuing the spark discharge by the primary sub coil 3B. A DC power supply B connected to a control circuit (not shown) and ground G are also connected to the igniter 51.

As shown in FIG. 4, the primary main coil 3A and the primary sub coil 3B receive signals from the electronic control device 60 and the igniter 51 and are energized to generate an induced electromotive force in the secondary coil 4. The DC power supply B is connected to a relay point T at which a first firstly-wound end 311 of the primary main coil 3A and a first secondly-wound end 321 of the primary sub coil 3B are connected. The first switching element 512 is connected to a second firstly-wound end 312 of the primary main coil 3A, and the second switching element 513 is connected to a second secondly-wound end 322 of the primary sub coil 3B.

The low-voltage winding end 411 of the secondary coil 4 is connected to the ground G via a diode 25 for preventing backflow and a resistor 26. The high-voltage winding end 412 of the secondary coil 4 is connected to the tower part 12, to which the spark plug 61 is attached via high-voltage conductors 27 and 28. Note that the current flowing through the low-voltage winding end 411 of the secondary coil 4 may be fed back and used to control switching of the second switching element 513.

Figure 5:
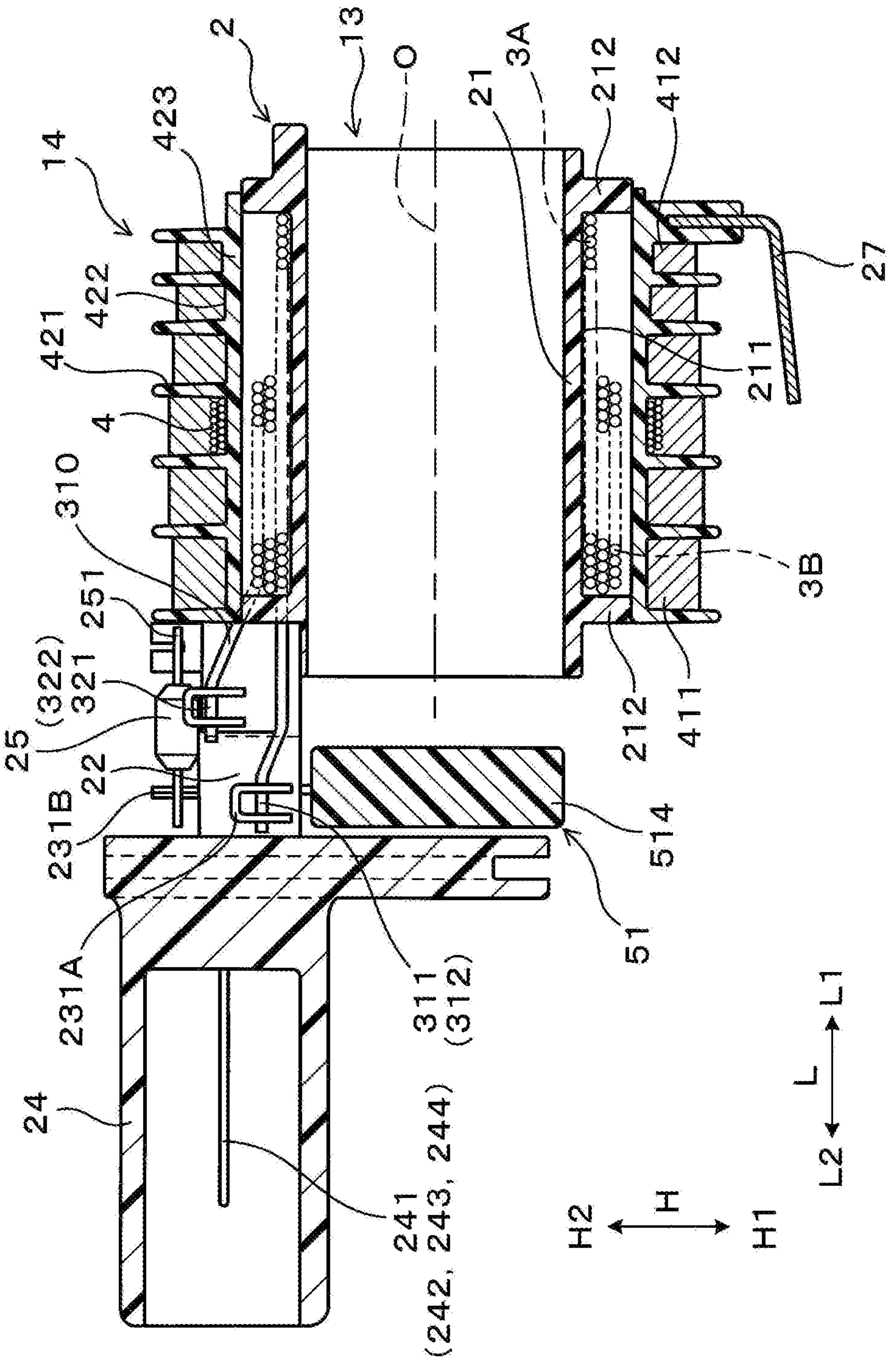
FIG. 5 is an explanatory view showing a cross section of an assembly of a primary bobbin with a primary coil and a secondary bobbin with a secondary coil according to the first embodiment.
Figure 6:
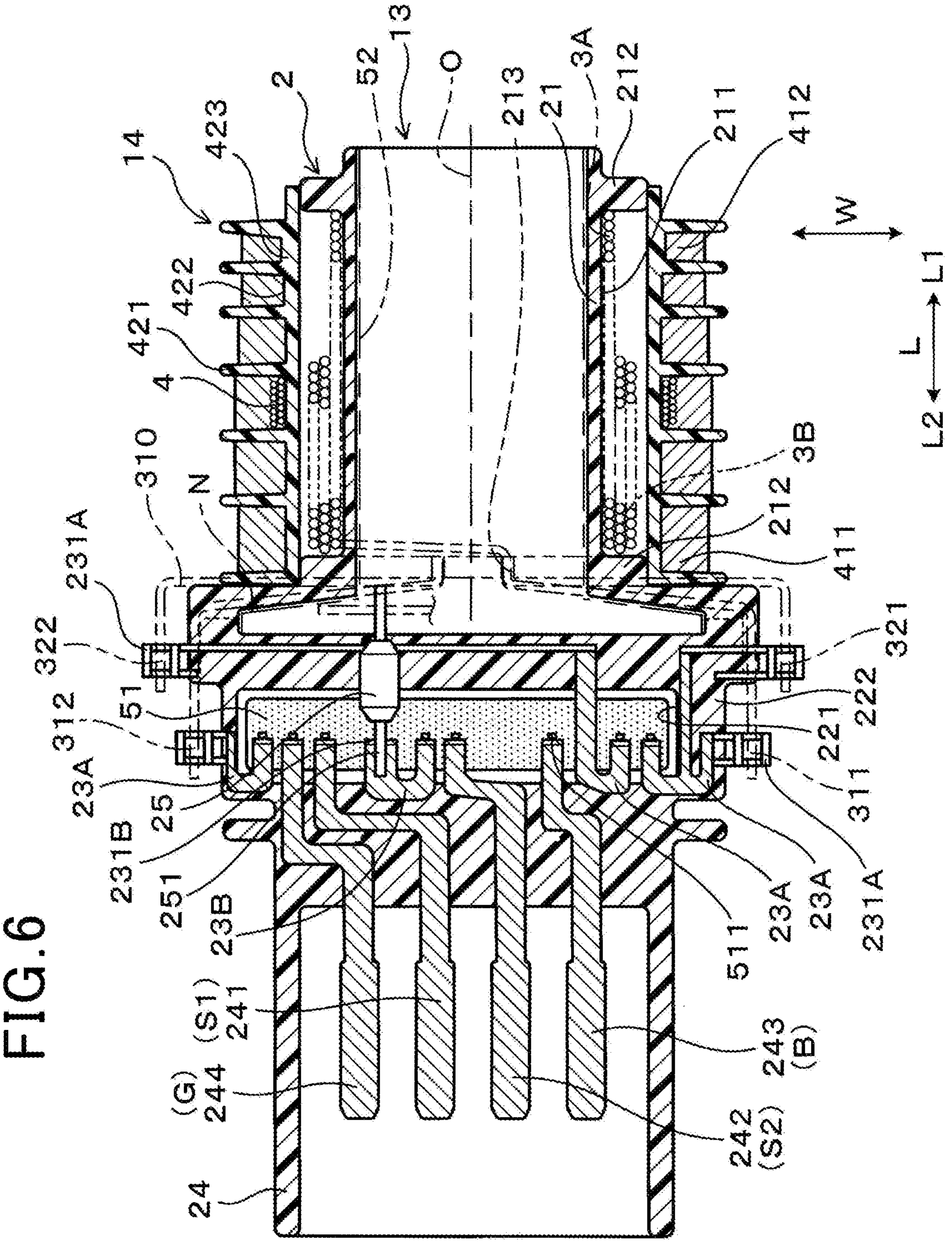
FIG. 6 is an explanatory view showing another cross section of the assembly of the primary bobbin with the primary coil and the secondary bobbin with the secondary coil according to the first embodiment.

As shown in FIGS. 4 to 6, the igniter 51 includes terminals 511, the switching elements 512, 513, the resistor 26, a control circuit (not shown), and a molded resin member 514 covering parts of the terminals 511, the switching elements 512, 513, and other components. The remaining parts of the terminals 511 of the igniter 51 protrude from the molded resin member 514 so that they come into contact with and are connected to terminals 241, 242, 243, 244 of the connector part 24.

(Primary Main Coil 3A)

Figure 7:
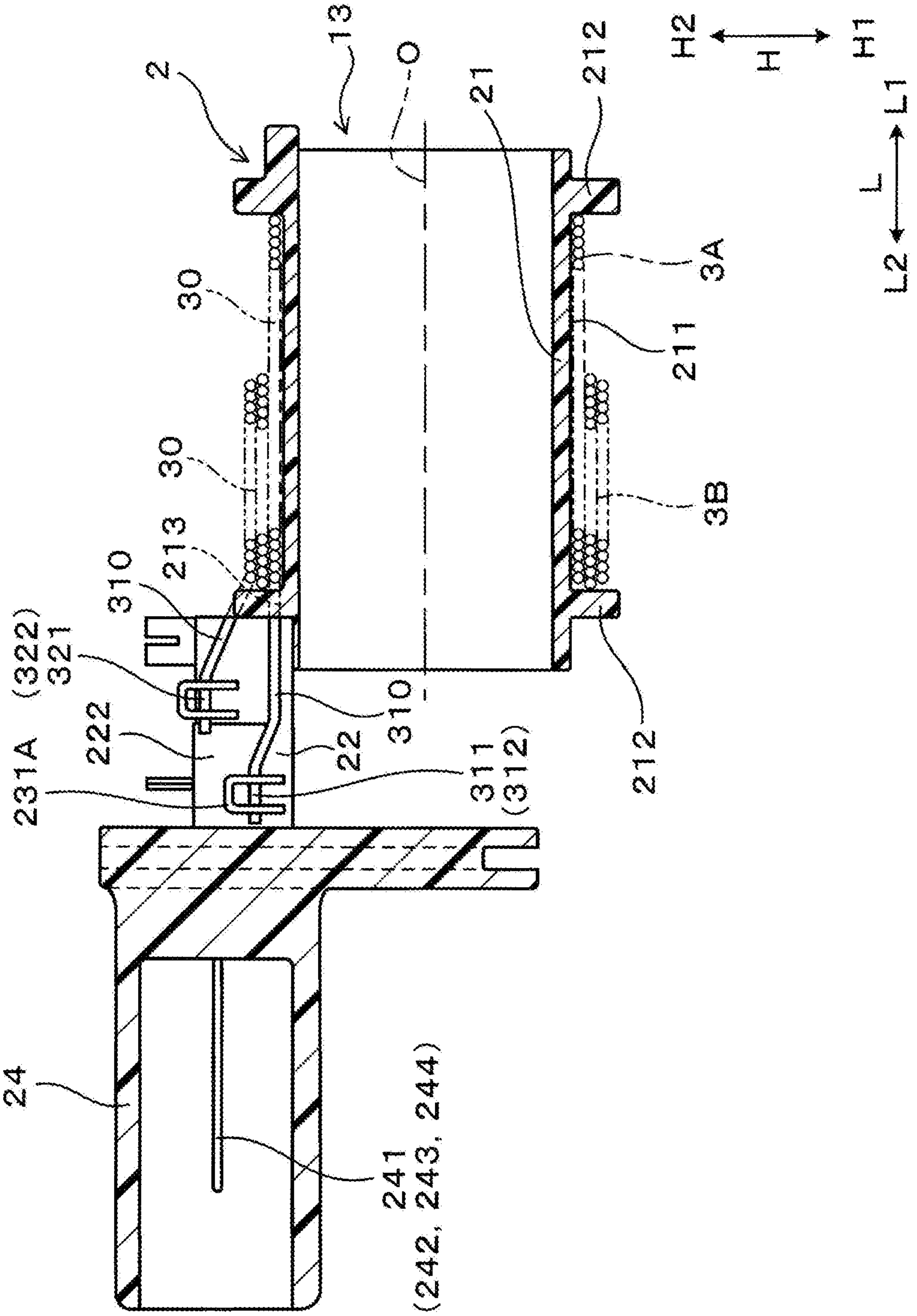
FIG. 7 is an explanatory view showing a cross section of the primary bobbin with the primary coil according to the first embodiment.
Figure 8:
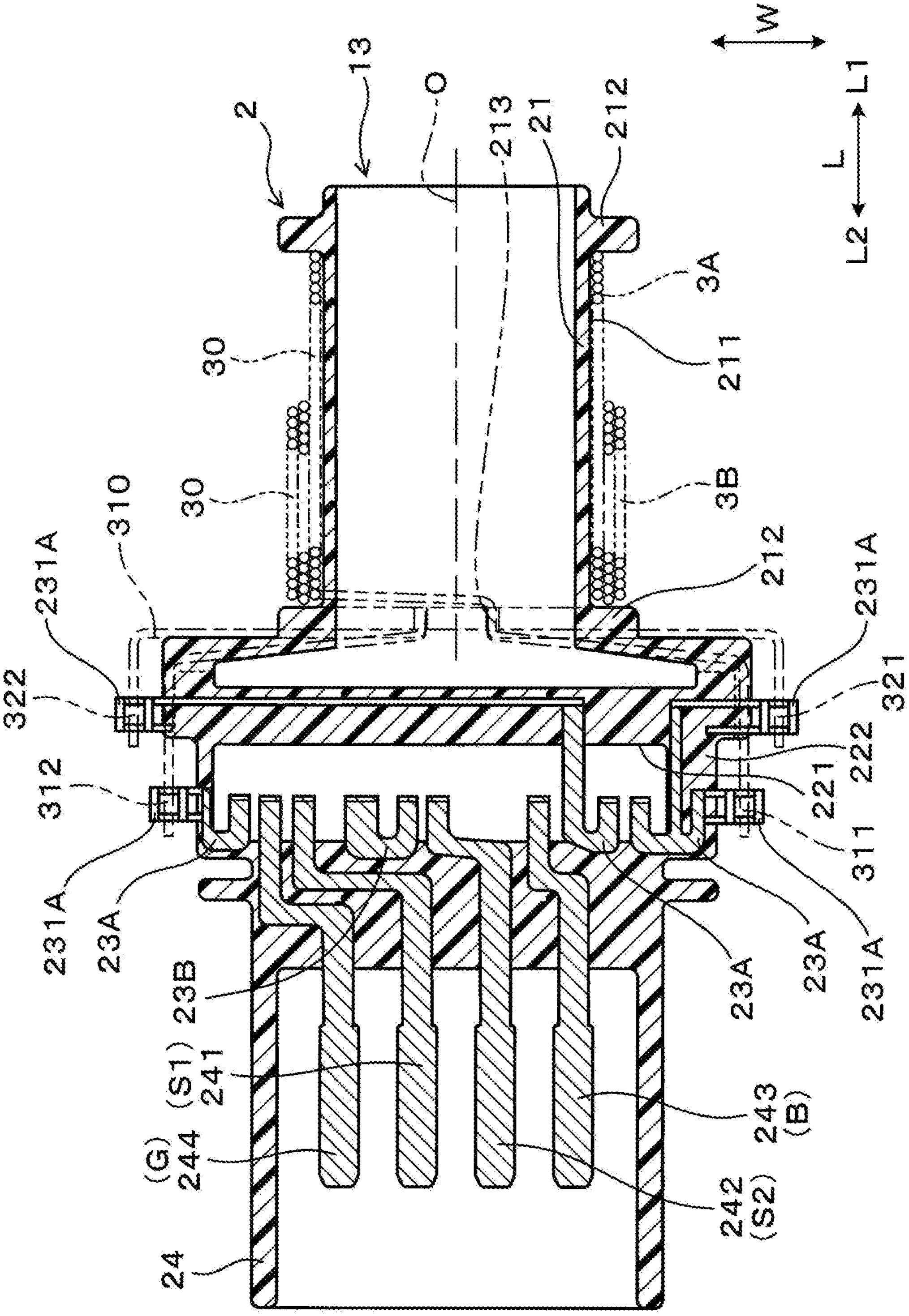
FIG. 8 is an explanatory view showing another cross section of the primary bobbin with the primary coil according to the first embodiment.

As shown in FIGS. 7 and 8, the primary main coil 3A is wound around the outer surface of the winding cylinder part 21 of the primary bobbin 2. The primary main coil 3A covers the entire length in the axial direction L of an annular recess 211 formed in the winding cylinder part 21 of the primary bobbin 2. The number of turns of the primary main coil 3A is larger than that of the primary sub coil 3B, and the inductance of the primary main coil 3A is larger than the inductance of the primary sub coil 3B. The energy of the spark discharge generated by the spark plug can be increased by combining the primary main coil 3A and the primary sub coil 3B.

The primary main coil 3A of this embodiment forms the firstly-wound coil. The primary main coil 3A is a coil wound first around the winding cylinder part 21 of the primary bobbin 2, and includes the innermost coil part around the winding cylinder part 21. In this case, a winding part 30 of the primary main coil 3A corresponds to the "innermost coil part around the winding cylinder part 21". The primary main coil 3A includes the winding part 30 and a pair of lead parts 310. The firstly-wound ends 311, 312 are formed as tips of the lead parts 310.

(Primary Sub Coil 3B)

As shown in FIGS. 7 and 8, the primary sub coil 3B is wound around the outer surface of the primary main coil 3A wound around the winding cylinder part 21 of the primary bobbin 2. Further, the primary sub coil 3B is wound only on the side closer to the connection part 22 in the axial direction L. In other words, the primary sub coil 3B is provided only around a part of the annular recess part 211 of the winding cylinder part 21 on the low voltage side L2 in the axial direction L. The primary sub coil 3B of the present embodiment forms the secondly-wound coil. The primary sub coil 3B is a coil wound later around the winding cylinder part 21 of the primary bobbin 2, and includes the outermost coil part around the winding cylinder part 21. The primary sub coil 3B includes a winding part 30 and a pair of lead parts 310. The secondly-wound ends 321, 322 are formed as tips of the lead parts 310.

Since the primary sub coil 3B is provided only around a part of the annular recess part 211 on the low voltage side L2 in the axial direction L, the distance between the part of the secondary coil 4 on the high voltage side L1 in the axial direction L and the primary sub coil 3B can be increased as much as possible. As a result, the insulation distance between the part of the secondary coil 4 on the high voltage side L1 and the primary sub coil 3B can be secured as much as possible, and the durability of the ignition coil 1 can be improved.

(Center Core 52 and Outer Core 53)

As shown in FIGS. 1 to 3, a center core 52 made of a soft magnetic material is inserted inside the primary coils 3A, 3B and the secondary coil 4 and also inside the primary bobbin 2 and the primary coils 3A, 3B. The central core 52 may be composed of a plurality of laminated electromagnetic steel sheets. The central core 52 may also be molded from powder. The central core 52 of the present embodiment is insert-molded inside the winding cylinder part 21 of the primary bobbin 2. An outer core 53 made of a soft magnetic material is provided outside the primary coils 3A and 3B and the secondary coil 4, and also outside the secondary bobbin 42 and the secondary coil 4. The outer core 53 may be composed of a plurality of laminated electromagnetic steel sheets. The outer core 53 may also be molded from powder.

The outer core 53 has a square frame shape when viewed from the height direction H, and is placed so that it surrounds the secondary bobbin 42 and the secondary coil 4. The two end faces of the central core 52 face the inner surface of the outer core 53. The central core 52 and the outer core 53 form a closed magnetic path in which the magnetic flux passes through the central core 52 in the axial direction L and passes through the outer core 53. In order to prevent the closed magnetic path through the center core 52 and the outer core 53 from becoming magnetically saturated, a permanent magnet 521 is placed between the end face of the center core 52 on the low voltage side L2 in the axial direction L, in other words, the end face of the center core 52 that is closer to the connection part 22 in the axial direction L, and the inner surface of the outer core 53.

The magnetic bias generated by the permanent magnet 521 enhances the magnetization characteristics of the center core 52 and the outer core 53, which in turn increases the voltage generated by the secondary coil 4. In addition, the permanent magnet 521 makes it possible to prevent magnetic saturation in the center core 52 and the outer core 53 even when the cross-sectional area of a cross section of the center core 52 orthogonal to the axial direction L is reduced.

As shown in FIG. 6, the cross-sectional area of a cross section (that is orthogonal to the axial direction L) of the ends of the central core 52 facing the permanent magnet 521 may be greater than that of a cross section of the remaining part (general part) of the central core 52 orthogonal to the axial direction L. In particular, as indicated by the dashed and double-dotted line N in FIG. 6, the cross-sectional area orthogonal to the axial direction L at the ends of the central core 52 facing the permanent magnet 521 may gradually increase as it gets further in the lateral direction W. In this case, the cross-sectional area of the cross section orthogonal to the axial direction L of the permanent magnet 521 may also be increased. This improves the voltage performance of high voltage generated in the secondary coil 4.

(Coil Case 54 and Tower Part 12)

As shown in FIGS. 1 and 2, the primary coils 3A and 3B, the primary bobbin 2, the secondary coil 4, the secondary bobbin 42, the central core 52, the outer core 53, the igniter 51, and the like are placed in a coil case 54 formed as a molded product of thermoplastic resin. The coil case 54 defines the outer shape of the coil main body part 11 and the tower part 12, and the tower part 12 extends from the coil case 54. The coil case 54 is provided with a cutout 541 in which the connector part 24 is placed, and a part of the walls of the coil case 54 is formed by the connector part 24.

The coil case 54 houses a coil assembly 10 composed of components such as the primary coils 3A and 3B, the primary bobbin 2 integrated with the connector part 24, the secondary coil 4, the secondary bobbin 42, the central core 52, the outer core 53, and the igniter 51. Further, gaps K formed between the components of the coil assembly 10 in a space (concave portion) surrounded by the coil case 54 and the connector part 24 are filled with an insulating thermosetting resin filler 55. The filler 55 is formed by casting.

An annular groove 542 into which the filler 55 is filled is formed at the base of the tower part 12. The withstand voltage of the filler 55 is higher than the withstand voltage of the coil case 54. The withstand voltage of the ignition coil 1 can be secured by placing the filler 55 at the base of the tower part 12.

Although not shown in the figures, a flange for attaching the ignition coil 1 to the cylinder head cover is formed on the outer surface of the coil case 54. The flange is provided with holes for inserting bolts.

(Primary Bobbin 2)

As shown in FIGS. 4 and 7 to 9, the primary main coil 3A and the primary sub coil 3B constituting the primary coil 3A, 3B are wound around the outer surface of the winding cylinder part 21 of the primary bobbin 2 formed as a molded product of thermoplastic resin. In addition to the winding cylinder part 21 and the connection part 22, the primary bobbin 2 of the present embodiment is integrated with the connector part 24 connected to the connection part 22. The female connector of a harness component connected to an external electronic control device 60, the DC power supply B, and the ground G is attached to the connector part 24. The connector part 24 may be formed as a molded product of thermoplastic resin that is separate from the primary bobbin 2.

The connection part 22 is placed between the assembly of the winding cylinder part 21 around which the primary coil 3A, 3B is wound and the secondary bobbin 42 around which the secondary coil 4 is wound, and the connector part 24. In addition, electronic components such as the igniter 51 and the diode 25 are placed between the assembly of the primary coil 3A, 3B and the secondary coil 4 and the connector part 24. The low voltage side L2 of the secondary coil 4 is positioned on the connection part 22 side of the primary bobbin 2. These positional relationships make it possible to connect the primary coil 3A, 3B and the secondary coil 4 with the electronic components at one place that is far from the high-voltage winding end 412 of the secondary coil 4. As a result, the influence of high voltage on the electronic components can be minimized even in an ignition coil 1 with a primary coil 3A, 3B including two or more separately provided coil sections, and also the wiring can be facilitated.

The connection part 22 is provided with a plurality of connection terminals 23A to which the firstly-wound ends 311, 312 of the primary main coil 3A and the secondly-wound ends 321, 322 of the primary sub coil 3B are connected. The shape of the connection terminals 23A may differ as appropriate depending on the part connected by the terminal. The connection terminals 23A are provided with bifurcated connection ends 231A into which the firstly-wound ends 311, 312 of the primary main coil 3A and the secondly-wound ends 321, 322 of the primary sub coil 3B are inserted. The connection ends 231A are placed on both sides of the connection part 22 in the lateral direction W.

As shown in FIG. 8, on one side of the connection part 22 in the lateral direction W, two connection ends 231A are provided into which the first firstly-wound end 311 of the primary main coil 3A and the first secondly-wound end 321 of the primary sub coil 3B are inserted. On the other side of the connection part 22 in the lateral direction W, two connection ends 231A are provided into which the second firstly-wound end 312 of the primary main coil 3A and the second secondly-wound end 322 of the primary sub coil 3B are inserted. The firstly-wound ends 311, 312 and the secondly-wound ends 321, 322 are each slid into a groove 232 formed in a connection end 231A to connect them to the corresponding connection terminal 23A.

Figure 9:
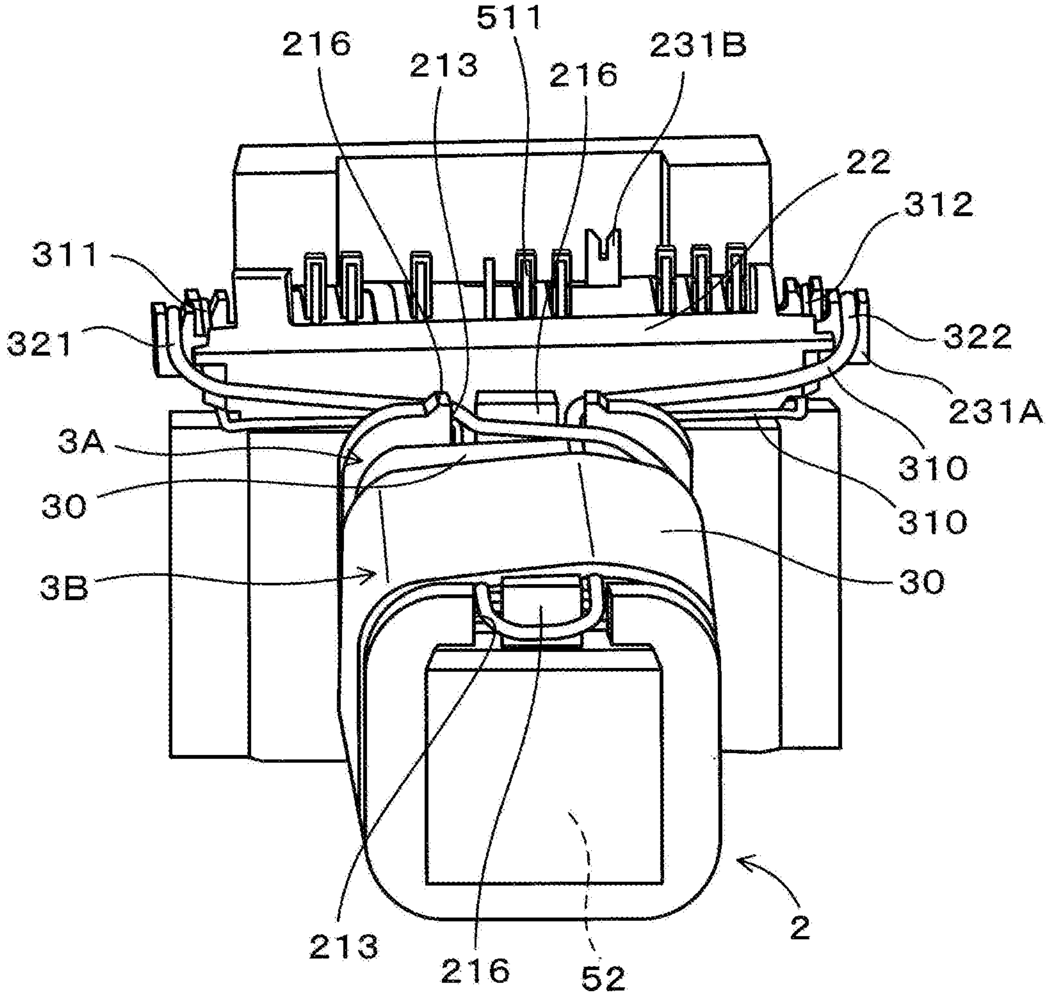
FIG. 9 is a perspective view showing the primary bobbin with the primary coil according to the first embodiment.

As shown in FIGS. 8 and 9, the winding cylinder part 21 of the primary bobbin 2 includes an annular recess part 211 around which the primary main coil 3A and the primary sub coil 3B are wound, and collar parts 212 formed at the ends of the annular recess part 211 in the axial direction L. The collar parts have a diameter larger than that of the annular recess part 211. The collar part 212 located on the low voltage side L2 of the winding cylinder part 21 in the axial direction L has wiring grooves 213 in which lead parts 310 of the primary main coil 3A (the parts close to the firstly-wound ends 311, 312) and lead parts 310 (the parts close to the secondly-wound ends 321, 322) of the primary sub coil 3B are inserted. Protruded parts 216 that are protruded from the remaining part may be formed on the collar part 212 on the low voltage side L2 in the axial direction L so that there are protrusions on both sides of each wiring groove 213. This helps locking the lead parts 310 in the wiring grooves 213.

The number of winding layers of the primary main coil 3A and the primary sub coil 3B in the radial direction R of the winding cylinder part 21 may be an odd number such as one or three layers. When the number of winding layers is an odd number, the ends of the winding part 30 are located at opposite ends in the axial direction L. The number of winding layers of the primary main coil 3A and the primary sub coil 3B in the radial direction R of the winding cylinder part 21 may be an even number such as two or four layers. When the number of winding layers is an even number, the ends of the winding part 30 are located at the same end in the axial direction L.

When the number of winding layers of the primary main coil 3A is an odd number, the lead part 310 of the primary main coil 3A may be located between the high voltage side L1 and the low voltage side L2 along the axial direction L of the winding cylinder part 21. Further, in this case, the annular recess part 211 of the winding cylinder part 21 and the collar part 212 on the low voltage side L2 may have a wiring groove in which the lead part 310 of the primary main coil 3A extends along the axial direction L. This configuration for the case where the number of winding layers of the primary main coil 3A is an odd number similarly applies to the case where the number of winding layers of the primary sub coil 3B is an odd number.

The number of winding layers is determined by the relationship between the number of turns required to secure the coil output and the length of the annular recess part 211 of the winding cylinder part 21 of the primary bobbin 2 in the axial direction L. The size of the ignition coil 1 can be reduced by appropriately adjusting the length of the annular recess part 211 in the axial direction L in accordance with the number of turns.

As shown in FIGS. 7 to 9, when the number of winding layers of the primary main coil 3A or the primary sub coil 3B is an odd number of layers, a wiring groove is 213 may also be formed in the collar part 212 on the high voltage side L1 in the axial direction L, and the lead part 310 of the primary main coil 3A or the primary sub coil 3B having an odd number of winding layers is locked in the wiring groove 213 of the collar part 212 on the high voltage side L1 in the axial direction L. As with the above case, protruded parts 216 that are protruded from the remaining parts may be formed on both sides of each of the wiring groove 213 formed in the collar part 212 located on the high voltage side L1 in the axial direction L. This helps locking the lead parts 310 in the wiring grooves 213 and facilitates wiring of the lead parts 310. It also leads to size reduction of the ignition coil 1.

As shown in FIGS. 7 to 9, the connection part 22 of the primary bobbin 2 is provided with a hole 221 in which the terminals 241, 242, 243, 244 of the connector part 24 and the terminals 511 of the igniter 51 are placed, and a pair of connecting parts 222 formed on both sides of the hole 221 in the lateral direction W and connected to the connector part

24. The terminals 241, 242, 243, 244 of the connector part 24 and the terminals 511 of the igniter 51 are pulled out from the hole 221 to the opening side H2 in the height direction H to be connected.

The pair of connecting parts 222 are formed at positions offset to the opening side H2 in the height direction H with respect to the positions of the central core 52 and the outer core 53 in the height direction H. The connection ends 231A of the connection terminals 23A of the connection part 22 are placed at positions offset to the opening side H2 in the height direction H from the central axis O of the winding cylinder part 21. The firstly-wound ends 311, 312 of the primary main coil 3A and the secondly-wound ends 321, 322 of the primary sub coil 3B are placed at positions offset to the opening side H2 in the height direction H from the central axis O of the winding cylinder part 21.

Figure 10:
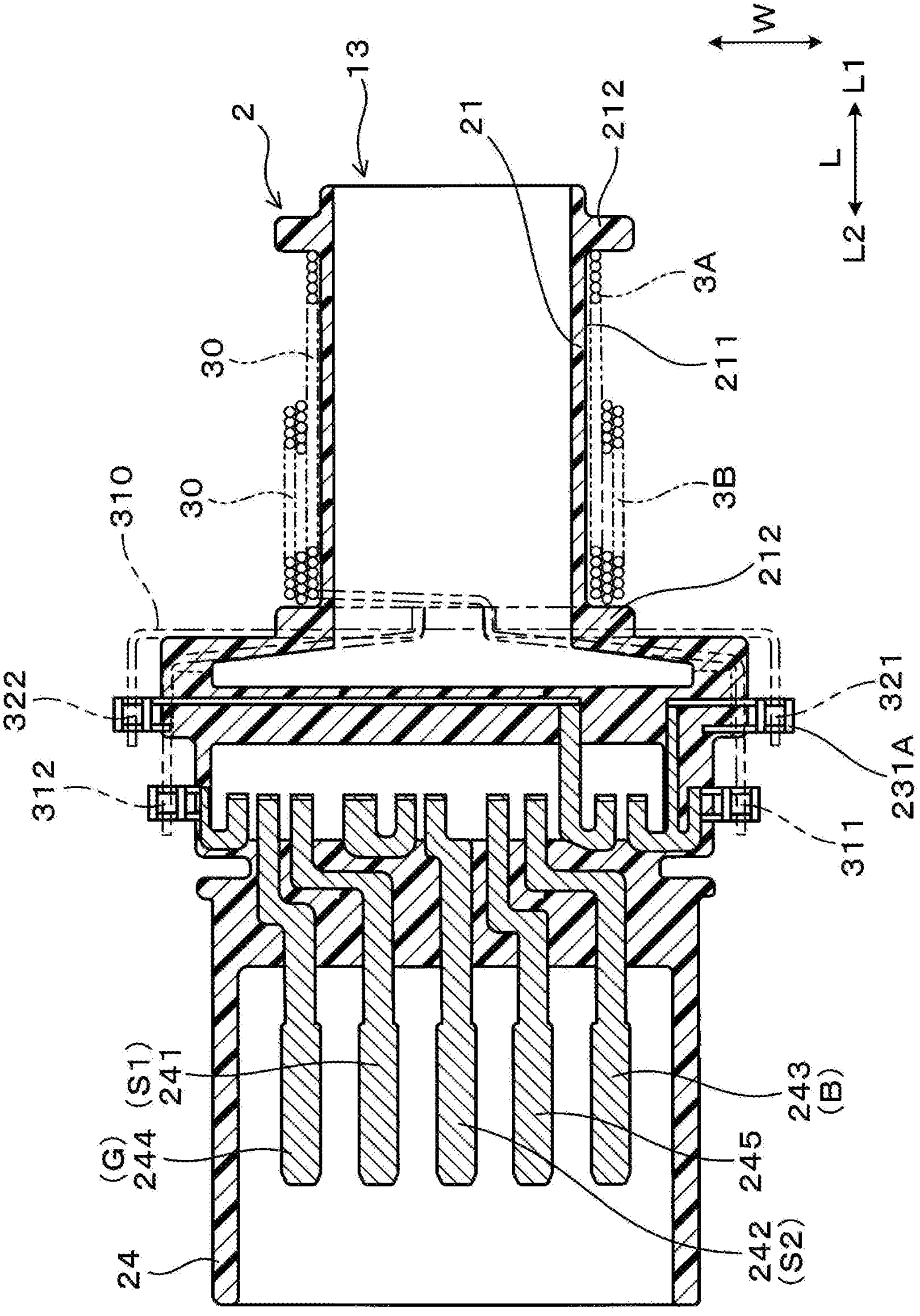
FIG. 10 is an explanatory view showing a cross section of another assembly of another primary bobbin with a primary coil and a secondary bobbin with a secondary coil according to the first embodiment.

The connector part 24 has four terminals, namely, a terminal 241 for a first ignition signal S1 for allowing energization of the primary main coil 3A, a terminal 242 for a second ignition signal S2 for allowing energization of the primary sub coil 3B, a terminal 243 for the DC power supply B, and a terminal 244 for the ground G. As shown in FIG. 10, in addition to these four terminals, the connector part 24 may be provided with a terminal 245 for a failure signal for indicating that the ignition coil 1 has failed.

(Connection Terminals 23A, 23B)

As shown in FIGS. 5 and 6, the electric connection between the first firstly-wound end 311 of the primary main coil 3A and the first secondly-wound end 321 of the primary sub coil 3B is established by the connection terminal 23A of the connection part 22 of the primary bobbin 2. The connection end 231A into which the first firstly-wound end 311 is inserted and the connection end 231A into which the first secondly-wound end 321 is inserted are linked by the connection terminal 23A. This connection terminal 23A has a branched shape to connect the connection end 231A into which the first firstly-wound end 311 is inserted and the connection end 231A into which the first secondly-wound end 321 is inserted to the DC power supply B. This configuration facilitates connecting the primary main coil 3A and the primary sub coil 3B to the connection part 22 in a concentrated manner.

Further, the igniter 51 is placed on the low voltage side L2 in the axial direction L with respect to the winding cylinder part 21, and the terminals 511 of the igniter 51 as a whole face the terminals 241, 242, 243, 244 of the connector part 24 as a whole in the direction of the high voltage side L1 in the axial direction L. All the terminals 241, 242, 243, 244 of the connector part 24 and all the terminals 511 of the igniter 51 are joined together with the same orientations. As a result, the terminals 241, 242, 243, 244 of the connector part 24 and the terminals 511 of the igniter 51 can be joined together efficiently. Therefore, for example, the terminals 241, 242, 243, 244 of the connector part 24 and the terminals 511 of the igniter 51 can be joined by a robot, which improves the reliability of the joining process.

The connection terminal 23A for connecting the connection end 231A into which the first firstly-wound end 311 is inserted and the connection end 231A into which the first secondly-wound end 321 is inserted to the DC power supply B corresponds to the relay point T in FIG. 4. Connection of the primary main coil 3A and the primary sub coil 3B to the DC power supply B can be facilitated by using one connection terminal 23A for connection with the first firstly-wound end 311 and the first secondly-wound end 321. In addition, the man-hours required for assembly in the manufacturing of the ignition coil 1 can be reduced.

Further, the other connection terminals 23A, 23B of the connection part 22 of the primary bobbin 2 have a U-turn shape for reversing the orientation in the axial direction L. All the terminals 241, 242, 243, 244 of the connector part 24 and all the terminals 511 of the igniter 51 can be joined together with the same orientations by using the connection terminals 23A, 23B having a U-turn shape. As a result, the man-hours required for assembly in the manufacturing of the ignition coil 1 can be reduced.

(Firstly-Wound Ends 311, 312, Secondly-Wound Ends 321, 322, and Connection Ends 231A)

Figure 11:
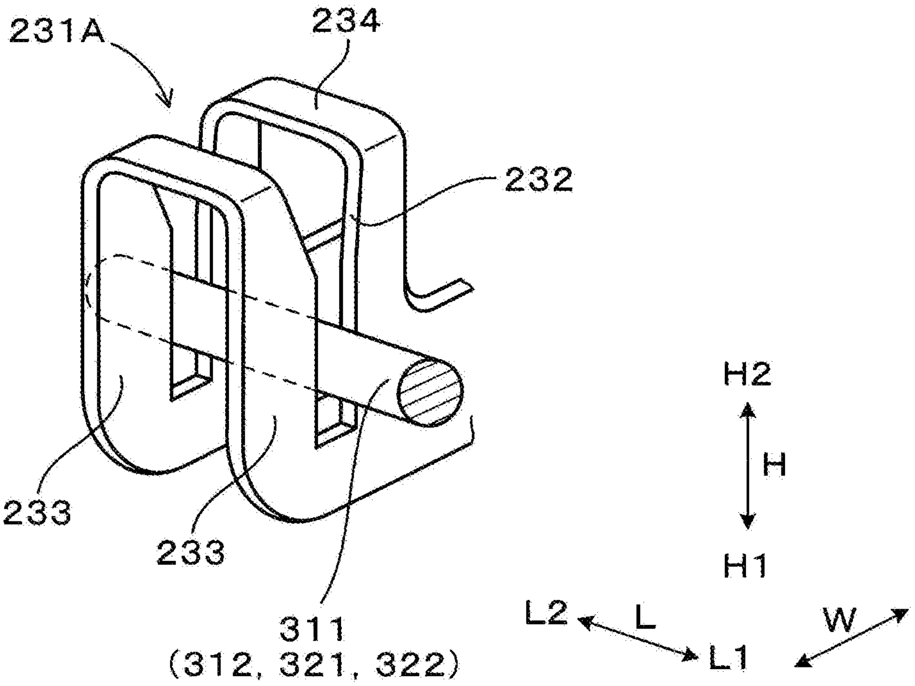
FIG. 11 is a perspective view showing a connection end of a connection terminal to which ends of the primary main coil and the primary sub coil are attached according to the first embodiment.

As shown in FIGS. 3, 9, and 11, the grooves 232 in the connection ends 231A of all the connection terminals 23A of the primary bobbin 2 are oriented in a certain direction in the ignition coil 1. The grooves 232 in the connection ends 231A of all the connection terminals 23A of the present embodiment are open toward the opening side H2 in the height direction H. In other words, the groove 232 of each connection end 231A is cut from the opening side H2 toward the deeper side H1 in the height direction H. The firstly-wound ends 311, 312 of the primary main coil 3A and the secondly-wound ends 321, 322 of the primary sub coil 3B are slid into the grooves 232 of the connection ends 231A from the opening side H2 toward the deeper side H1 in the height direction H. As a result, the firstly-wound ends 311, 312 of the primary main coil 3A and the secondly-wound ends 321, 322 of the primary sub coil 3B can be attached to the connection terminals 23A from the same direction. This enables reduction in the number of man-hours for assembling the ignition coil 1, automation of the assembly of the ignition coil 1, and the like.

The firstly-wound ends 311, 312 and the secondly-wound ends 321, 322 are attached to the connection ends 231A of the connection terminals 23A provided in the connection part 22. The connection ends 231A to which the firstly-wound ends 311, 312 are attached and the connection ends 231A to which the secondly-wound ends 321, 322 are attached are offset from each other in the lateral direction W.

As shown in FIG. 11, the connection end 231A of each connection terminal 23A has a pair of plate parts 233 facing each other in the axial direction L and a linking part 234 linking the ends of the pair of plate parts 233 on the opening side H2 in the height direction H. The groove 232 of each connection end 231A divides the pair of plate parts 233 and the linking part 234 into two from the opening side H2 in the height direction H. The firstly-wound ends 311, 312 and the secondly-wound ends 321, 322 are supported by the pair of plate parts 233 of each connection end 231A once they are slid into the grooves 232.

The connection ends 231A into which each firstly-wound end 311, 312 and each firstly-wound end 311, 312 are inserted are placed on opposite sides of the central axis O of the winding cylinder part 21, side by side in the lateral direction W. The connection ends 231A into which each secondly-wound end 321, 322 and each secondly-wound end 321, 322 are inserted are also placed on opposite sides of the central axis O of the winding cylinder part 21, side by side in the lateral direction W. The firstly-wound ends 311, 312 and the secondly-wound ends 321, 322 of the present embodiment are arranged so that they are symmetrical in the lateral direction W with respect to the central axis O of the winding cylinder part 21.

The firstly-wound ends 311, 312 and the secondly-wound ends 321, 322 do not necessarily have to be arranged symmetrically in the lateral direction W. In this case as well, the precondition that the shortest distance r1 from the central axis O of the winding cylinder part 21 to each firstly-wound end 311, 312 is smaller than the shortest distance r2 from the central axis O of the winding cylinder part 21 to each secondly-wound end 321, 322 should be met.

When the direction in which the grooves 232 of the connection ends 231A are formed is directed in the height direction H, the connection ends 231A into which each firstly-wound end 311, 312 of the primary main coil 3A is inserted and the connection ends 231A into which each secondly-wound end 321, 322 of the primary sub coil 3B is inserted are offset from each other at least in the lateral direction W.

Figure 12:
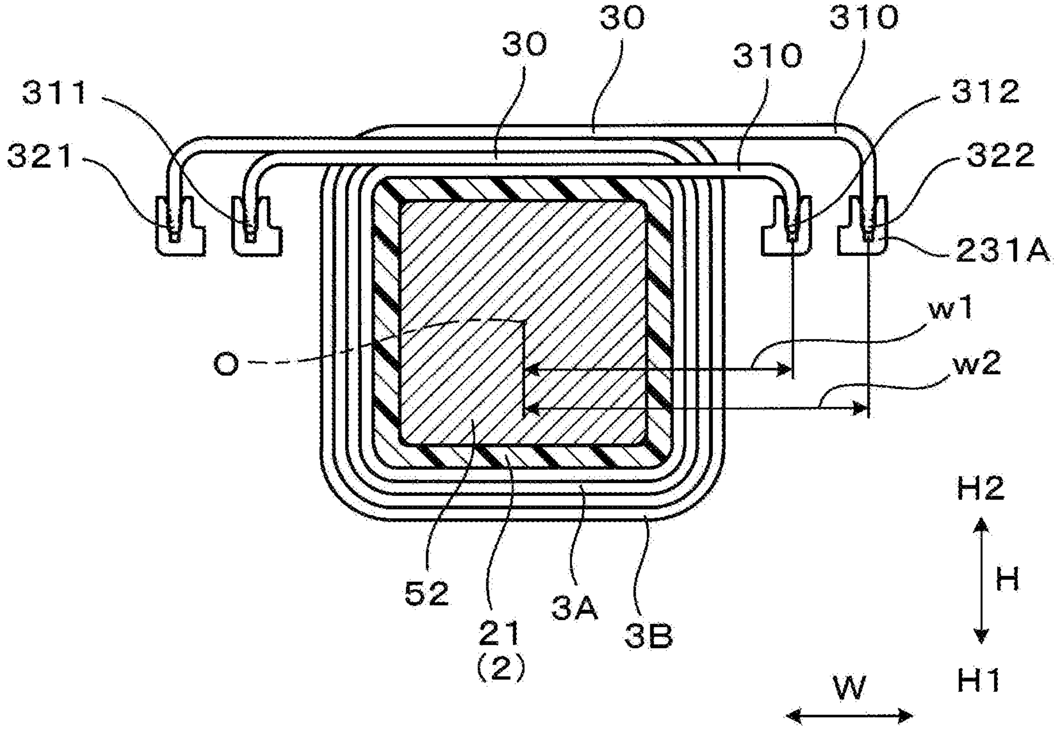
FIG. 12 is an explanatory view schematically showing positions of ends of the primary main coil and the primary sub coil with respect to a central axis of a winding cylinder part according to the first embodiment.

Specifically, in this case, as shown in FIG. 12, on condition that the shortest distance r1 from the central axis O of the winding cylinder part 21 to each firstly-wound end 311, 312 is smaller than the shortest distance r2 from the central axis O of the winding cylinder part 21 to each secondly-wound end 321, 322, the firstly-wound ends 311, 312 as a whole and the secondly-wound ends 321, 322 as a whole may be positioned so that they are offset from each other only in the lateral direction W. On both sides of the central axis O of the winding cylinder part 21 in the lateral direction W, the secondly-wound end 321, 322 is placed on the outer side of firstly-wound end 311, 312 in the lateral direction W. In other words, the distance w1 of the component in the lateral direction W from the central axis O of the winding cylinder part 21 to the wire center of each firstly-wound end 311, 312 is smaller than the distance w2 of the component in the lateral direction W from the central axis O of the winding cylinder part 21 to the wire center of each secondly-wound end 321, 322. The connection ends 231A to which the firstly-wound ends 311, 312 are attached are on the inner side of the connection ends 231A to which the secondly-wound ends 321, 322 are attached in the lateral direction W. Note that the distances w1 and w2 are shown as distances in the lateral direction W from a plane parallel to the height direction H and including the central axis O to the firstly-wound ends 311, 312 or the secondly-wound ends 321, 322. The distances w1 and w2 can also be referred to as lateral distances w1 and w2.

When the direction in which the grooves 232 of the connection ends 231A are formed is directed in the height direction H, the firstly-wound coil ends 311, 312 and the secondly-wound coil ends 321, 322 may be offset not only in the lateral direction W but also in at least one of the axial direction L and the height direction H. The connection ends 231A to which the firstly-wound ends 311, 312 are attached and the connection ends 231A to which the secondly-wound ends 321, 322 are attached may be offset not only in the lateral direction W but also in at least one of the axial direction L and the height direction H. As shown in FIGS. 3, 5, and 6, in this embodiment, the secondly-wound ends 321, 322 are placed outside the firstly-wound ends 311, 312 in the lateral direction W, and the firstly-wound ends 311, 312 and the secondly-wound ends 321, 322 are offset from each other in the axial direction L and the height direction H.

Specifically, as shown in FIG. 3, the firstly-wound ends 311, 312 and the secondly-wound ends 321, 322 are placed further from the tower part 12 in the height direction H than the central axis O of the winding cylinder part 21 is. In other words, the firstly-wound ends 311, 312 and the secondly-wound ends 321, 322 are offset to the opening side H2 in the height direction H from the central axis O of the winding cylinder part 21. Further, as shown in FIGS. 1 and 2, on both sides of the central axis O of the winding cylinder part 21 in the lateral direction W, the position of the firstly-wound end 311, 312 in the axial direction L differs from the position of the secondly-wound end 321, 322 in the axial direction L. Furthermore, the position of each firstly-wound end 311, 312 in the height direction H differs from the position of each secondly-wound end 321, 322 in the height direction H.

When the direction in which the grooves 232 of the connection ends 231A are formed is directed in the height direction H, since the firstly-wound ends 311, 312 and the secondly-wound ends 321, 322 are offset at least in the lateral direction W, when the firstly-wound ends 311, 312 or the secondly-wound ends 321, 322 are to be slid into the grooves 232 of the connection ends 231A by an attaching jig 8, it is possible to prevent the jig 8 from interfering with any of the firstly-wound ends 311, 312, the secondly-wound ends 321, 322, and the connection ends 231A. The same effect can be obtained when the connection ends 231A to which the firstly-wound ends 311, 312 are attached and the connection ends 231A to which the secondly-wound ends 321, 322 are attached are offset in the lateral direction W.

When the firstly-wound ends 311, 312 and the secondly-wound ends 321, 322 are offset in at least one of the axial direction L and the height direction H, it is possible to prevent the interference between the firstly-wound ends 311, 312, the secondly-wound ends 321, 322 or the connection ends 231A and the attaching jig 8 even more appropriately. The same effect can be obtained when the connection ends 231A to which the firstly-wound ends 311, 312 are attached and the connection ends 231A to which the secondly-wound ends 321, 322 are attached are offset in at least one of the axial direction L and the height direction H.

The firstly-wound ends 311, 312 and secondly-wound ends 321, 322 are the sections of the lead parts 310 excluding the winding part 30 of the primary main coil 3A or the primary sub coil 3B wound annularly that are oriented parallel to the axial direction L of the primary bobbin 2 to be connected to the connection ends 231A of the connection terminals 23A.

The connection ends 231A of the connection terminals 23A of the primary bobbin 2 may have a structure that is different from the structure for engaging with the firstly-wound ends 311, 312 or secondly-wound ends 321, 322 by insertion (press fitting, pressure welding). For example, they may have a structure for engaging with the firstly-wound ends 311, 312 or secondly-wound ends 321, 322 by fusing, soldering, or welding. In this case, the connection ends 231A can be referred to as joining ends to which the firstly-wound ends 311, 312 or the secondly-wound ends 321, 322 are joined. In addition, in this case, a joining jig is used instead of the attaching jig 8.

Figure 13:
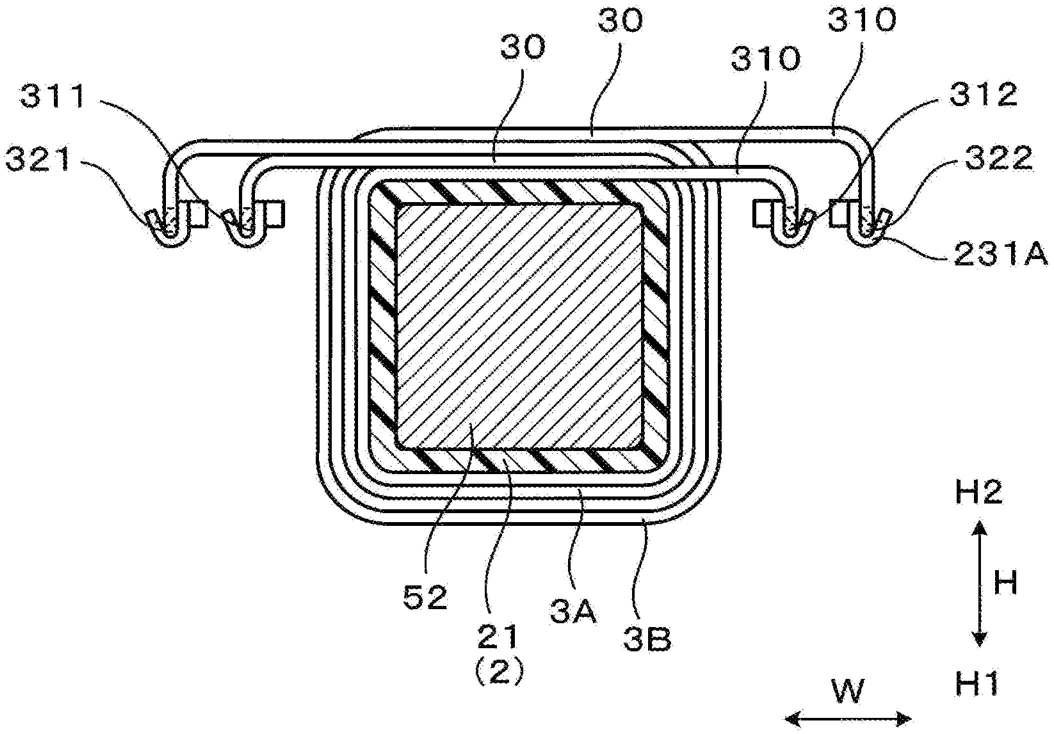
FIG. 13 is an explanatory view showing a case where the ends of the primary main coil and the primary sub coil are attached by fusing according to the first embodiment.

As shown in FIG. 13, when fusing is to be performed, the firstly-wound ends 311, 312 or the secondly-wound ends 321, 322 may be joined to the joining ends by applying pressure to the firstly-wound parts 311, 312 or the secondly-wound parts 321, 322 while passing current through the firstly-wound parts 311, 312 or the secondly-wound parts 321, 322.

Figure 14:
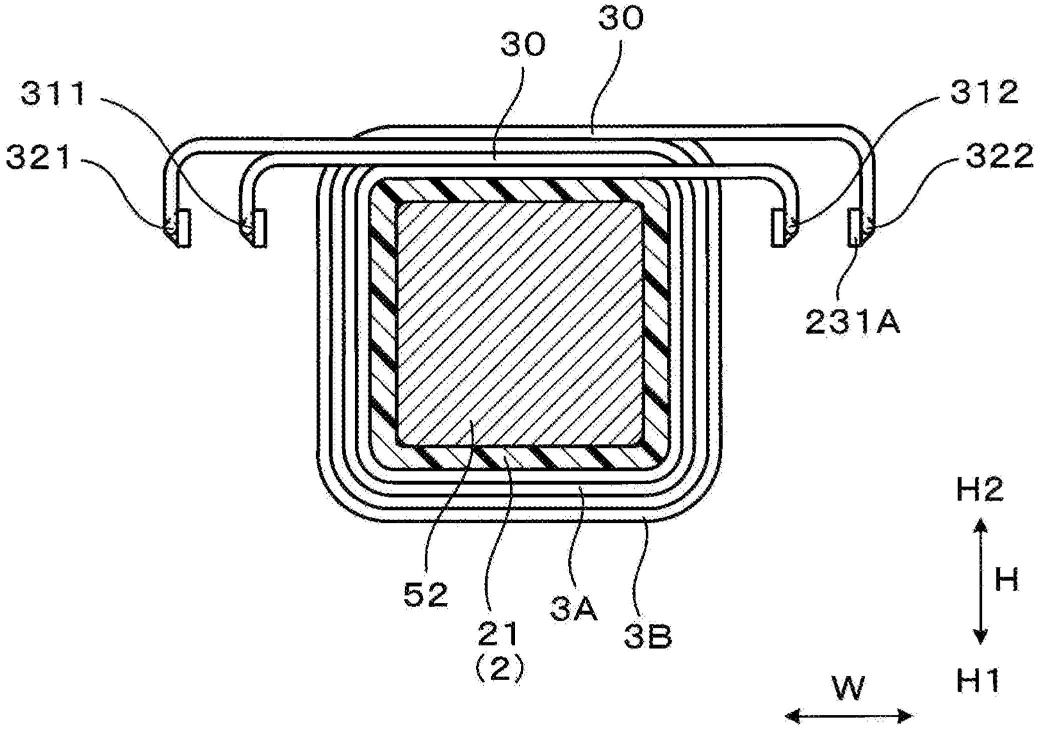
FIG. 14 is an explanatory view showing a case where the ends of the primary main coil and the primary sub coil are attached by soldering according to the first embodiment.

As shown in FIG. 14, when soldering is to be performed, the firstly-wound parts 311, 312 or the secondly-wound parts 321, 322 may be joined to the joining ends with molten solder. When welding is to be performed, the firstly-wound parts 311, 312 or the secondly-wound parts 321, 322 may be welded to the joining ends. Also in these cases, since there are spaces in the height direction H between the firstly-wound ends 311, 312 or the secondly-wound ends 321, 322 and the joining ends, it is possible to easily prevent interference between the firstly-wound ends 311, 312 or the secondly-wound ends 321, 322 and the joining jig.

(Diode 25)

As shown in FIGS. 5 and 6, the connection part 22 of the primary bobbin 2 is provided with a connection terminal 23B for connecting the winding ends 411, 412 of the secondary coil 4 and the diode 25. Connection ends 231B of the connection terminal 23B into which the diode 25 or the winding ends 411, 412 of the secondary coil 4 are inserted protrude from the primary bobbin 2. Conductor parts 251 extending from opposite ends of the diode 25 as well as the winding ends 411, 412 of the secondary coil 4 are slid into grooves 232 of the connection ends 231B.

Since both of the connection ends 231B to which the conductor part 251 extending from opposite ends of the diode 25 are connected are inserted into the primary bobbin 2, an error is less likely to occur in the attachment position of the diode 25 with respect to the primary bobbin 2. This facilitates connection of the diode 25 to the connection terminal 23B, enables automated connection of the diode 25 by a robot, and improves the reliability of the connection of the diode 25.

In the present embodiment, the directions in which the firstly-wound ends 311, 312 of the primary main coil 3A, the secondly-wound ends 321, 322 of the primary sub coil 3B, the winding ends 411 and 412 of the secondary coil 4, and the diode 25 are slid into the grooves 232 of the connection ends 231A, 231B of the connection terminals 23A, 23B of the connection part 22 of the primary bobbin 2 are the same, from the opening side H2 to the deeper side H1 in the height direction H. Further, all of the directions in which the grooves 232 of the connection ends 231A, 231B of the connection terminals 23A, 23B are formed are the same. As a result, the assembly process of the ignition coil 1 can be facilitated.

(Attaching Jig 8 for Firstly-Wound Ends 311, 312 and Secondly-Wound Ends 321, 322)

Figure 15:
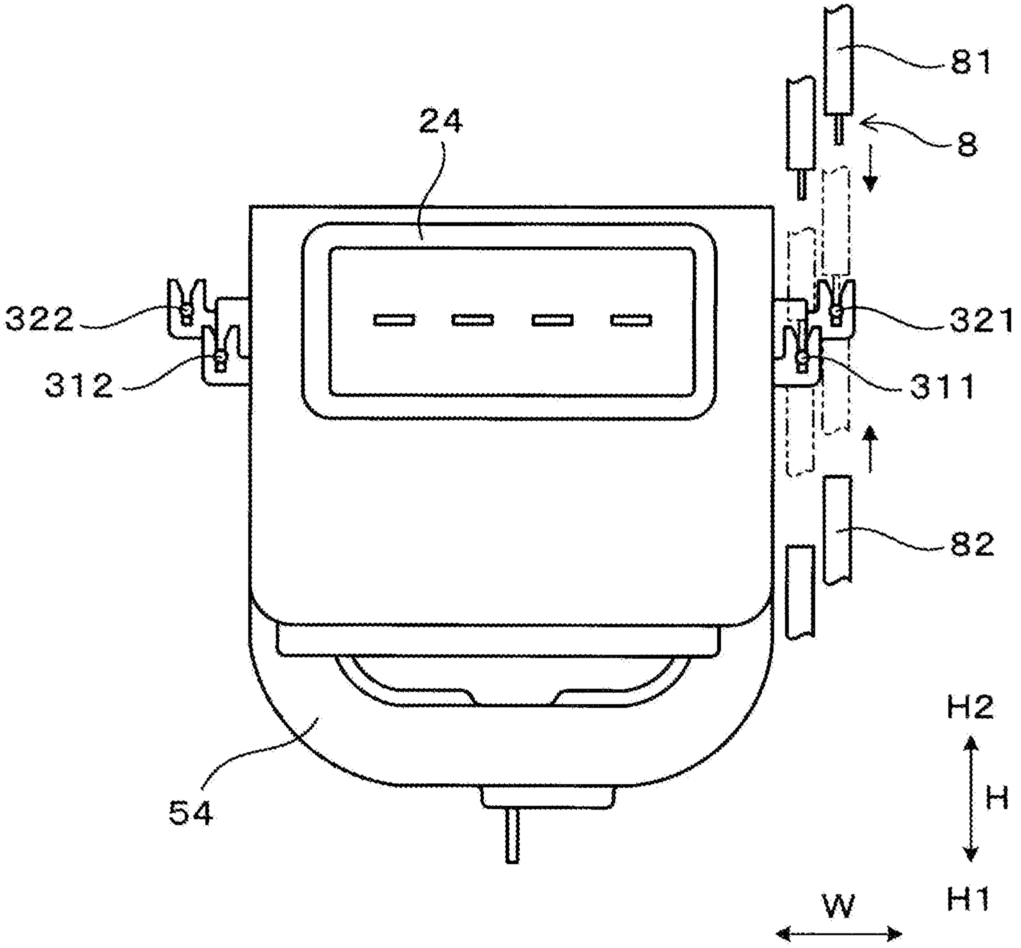
FIG. 15 is an explanatory view showing a state where an end of the primary main coil and an end of the primary sub coil are about to be attached to the connection ends of the connection terminal according to the first embodiment.

As shown in FIG. 15, the attaching jig 8 is used to slid the firstly-wound ends 311, 312 of the primary main coil 3A and the secondly-wound ends 321, 322 of the primary sub coil 3B into the grooves 232 of the connection ends 231A, 231B of the connection terminals 23A, 23B of the primary bobbin 2. The attaching jig 8 includes a holding jig part 81 for holding the firstly-wound end 311, 312 or the secondly-wound end 321, 322, and a receiving jig part 82 facing the holding jig part 81 for receiving the force applied by the holding jig part 81 to slide the firstly-wound end 311, 312 or the secondly-wound end 321, 322 into the groove 232. The firstly-wound ends 311, 312 or the secondly-wound ends 321, 322 are press-fitted into the grooves 232 by a press-fitting jig as the attaching jig 8.

When sliding the firstly-wound end 311, 312 or secondly-wound end 321, 322 held by the holding jig part 81 into the groove 232 of the connection end 231A from the opening side H2 in the height direction H, the receiving jig part 82 is pressed against the end face of the connection end 231A opposite to the groove from the deeper side H1 in the height direction H. Then, the receiving jig part 82 receives the force applied to the connection end 231A when the holding jig part 81 inserts the firstly-wound end 311, 312 or the secondly-wound end 321, 322 into the groove 232. The holding jig part 81 and the receiving jig part 82 sandwich the firstly-wound end 311, 312 or the secondly-wound end 321, 322 and the connection end 231A, and push the firstly-wound end 311, 312 or the secondly-wound end 321, 322 into the groove 232.

(Secondary Bobbin 42)

As shown in FIGS. 5 and 6, the secondary coil 4 is wound inside slots provided on the outer surface of the secondary bobbin 42 formed as a molded product of thermoplastic resin. The secondary bobbin 42 and the secondary coil 4 are on the outer side of the primary bobbin 2 and the primary coil 3A, 3B. In other words, the primary bobbin 2 and the primary coil 3A, 3B are inserted inside the secondary bobbin 42 and the secondary coil 4. The secondary bobbin 42 is provided with a plurality of annular recess parts 422 partitioned by a plurality of collar parts 421 lined up side by side in the axial direction L as slots lined up side by side in the axial direction L.

The thickness of the bottom 423 of an annular recess part 422 of the secondary bobbin 42 located on the high voltage side L1 in the axial direction L is larger than the thickness of the bottom 423 of an annular recess part 422 located on the low voltage side L2 in the axial direction L. The thickness of the bottoms 423 of the annular recess parts 422 may increase towards the high voltage side L1 in the axial direction L. In this case, the insulation distance between the high voltage side L1 part of the secondary coil 4 and the primary coil 3A, 3B can be maximized. As a result, the high voltage durability of the ignition coil 1 can be improved.

In the present embodiment, the thickness of the bottom part 423 of the annular recess part 422 at the edge (the first one) on the high voltage side L1 in the axial direction L is the largest. The thickness of the bottom part 423 of the second annular recess part 422 on the high voltage side L1 in the axial direction L is the next largest. The thickness of the bottom parts 423 of the remaining annular recess parts 422 other than the first and second annular recess parts 422 on the high voltage side L1 in the axial direction L is the smallest. The thickness of the annular recess part 422 may be gradually reduced toward the low voltage side L2 in the axial direction L.

(Winding of Primary Main Coil 3A and Primary Sub Coil 3B)

Figure 16:
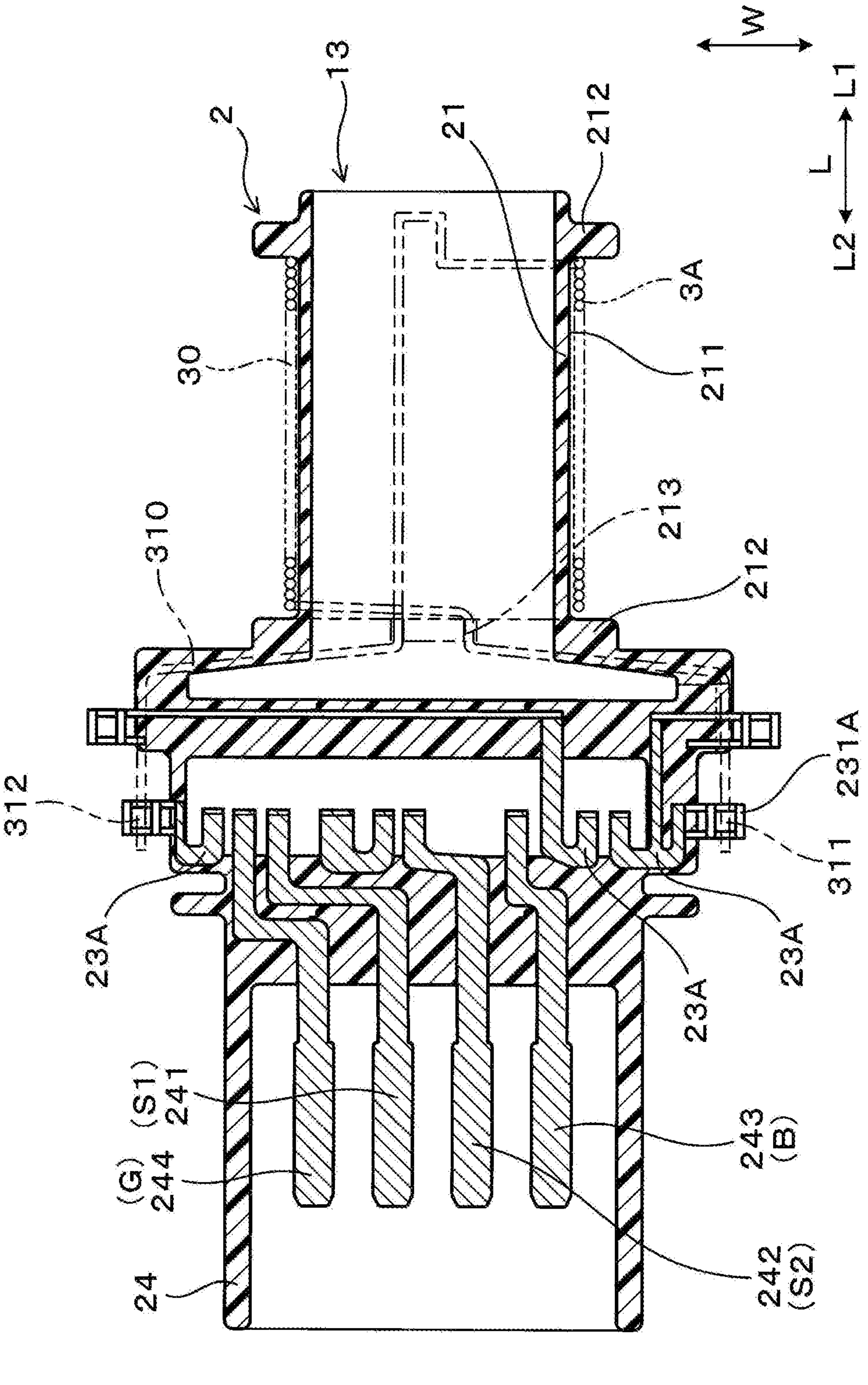
FIG. 16 is an explanatory view showing a cross section of the primary bobbin with the primary main coil according to the first embodiment.

The methods of winding the primary main coil 3A and the primary sub coil 3B around the primary bobbin 2 will be described. As shown in FIG. 16, in the present embodiment, the primary main coil 3A is wound around the winding cylinder part 21 of the primary bobbin 2 before the primary sub coil 3B. When the primary main coil 3A is wound, one end of a magnet wire is slid into the groove 232 of a connection end 231A of a connection terminal 23A on one side in the lateral direction W of the primary bobbin 2 by the attaching jig 8. The magnet wire is a copper conductor coated with resin such as varnish.

Next, the magnet wire rotates relatively around the primary bobbin 2 so that the magnet wire for forming the primary main coil 3A is wound inside the annular recess part 211 of the winding cylinder part 21 of the primary bobbin 2. After that, the other end of the magnet wire is slid into the groove 232 of a connection end 231A of a connection terminal 23A on the other side in the lateral direction W of the primary bobbin 2 by the attaching jig 8. The primary main coil 3A is thus placed around the outer surface of the winding cylinder part 21 of the primary bobbin 2.

Next, as shown in FIGS. 7 and 8, when the primary sub coil 3B is wound, one end of a magnet wire is slid into the groove 232 of a connection end 231A of a connection terminal 23A on one side in the lateral direction W of the primary bobbin 2 by the attaching jig 8. After that, the magnet wire rotates relatively around the primary bobbin 2 so that the magnet wire for forming the primary sub coil 3B is wound around the outer surface of the primary main coil 3A of the primary bobbin 2. Next, the other end of the magnet wire is slid into the groove 232 of a connection end 231A of a connection terminal 23A on the other side in the lateral direction W of the primary bobbin 2 by the attaching jig 8. The primary sub coil 3B is thus placed around the outer surface of the primary main coil 3A.

The two ends of each magnet wire form the two firstly-wound ends 311, 312 or the two secondly-wound ends 321, 322. When the wire diameter of the primary main coil 3A and the wire diameter of the primary sub coil 3B are the same, the primary main coil 3A and the primary sub coil 3B may be formed as below. That is, first, one magnet wire is wound around the winding cylinder part 21 of the primary bobbin 2, and appropriate parts of the magnet wire are slid into the grooves 232 of the connection ends 231A. Then, after forming a continuous winding constituted by the primary main coil 3A and the primary sub coil 3B around the primary bobbin 2, this magnet wire is cut at the relay point T to form the primary main coil 3A and the primary sub coil 3B. In this case, the productivity of the primary coil 3A, 3B is improved.

(Manufacturing of Ignition Coil 1)

Figure 17:
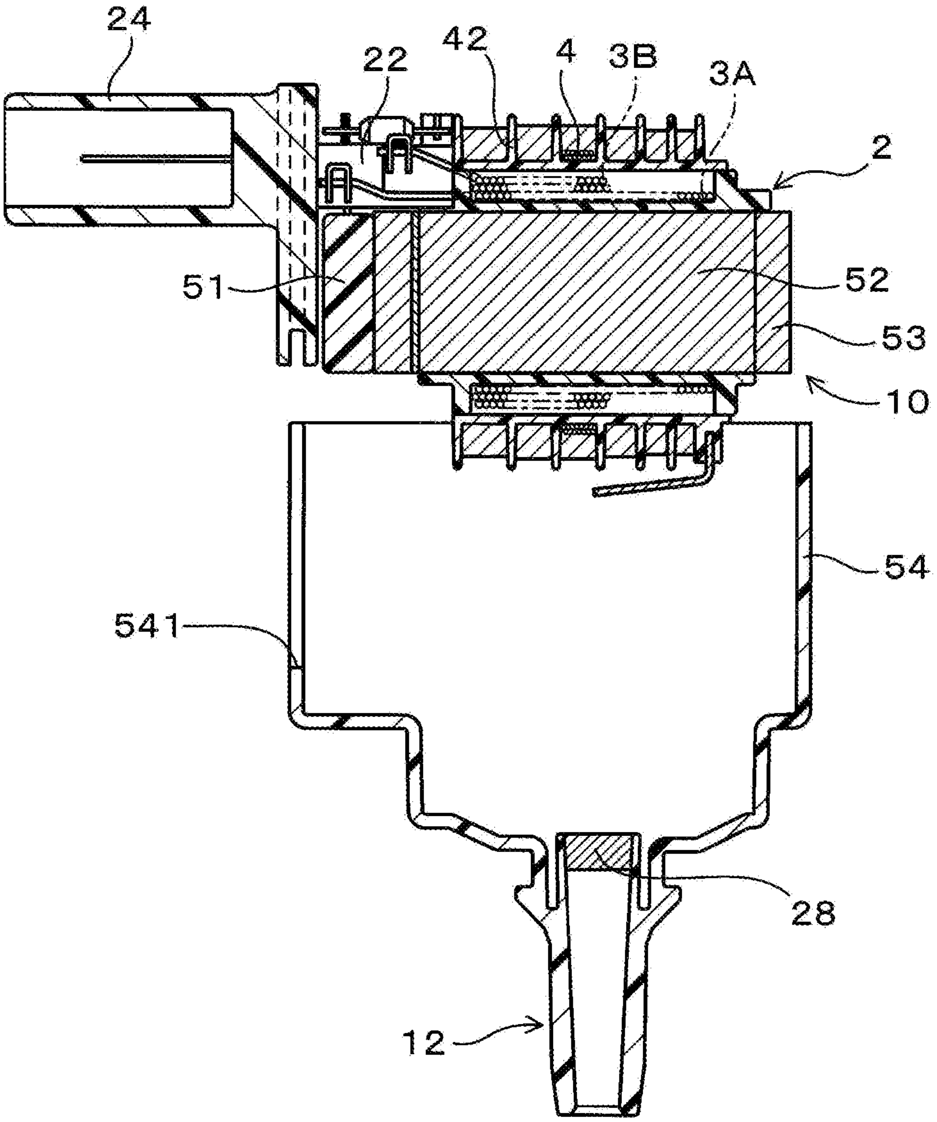
FIG. 17 is an explanatory view showing a state where a coil assembly is about to be placed inside a coil case according to the first embodiment.

As shown in FIG. 17, when the ignition coil 1 is manufactured, first, the coil assembly 10 of components such as the primary main coil 3A, the primary sub coil 3B, the primary bobbin 2, the secondary coil 4, the secondary bobbin 42, the central core 52, the outer core 53, the igniter 51, and the diode 25 is fabricated.

Specifically, when the coil assembly 10 is fabricated, as shown in FIGS. 8 to 10, the primary main coil 3A and the primary sub coil 3B are wound around the primary bobbin 2, and the diode 25 is attached to it to build up a primary bobbin assembly 13. The central core 52 is already insert-molded inside the primary bobbin 2. Further, as shown in FIGS. 5 and 6, a secondary bobbin assembly 14 is fabricated by winding the secondary coil 4 around the secondary bobbin 42, and attaching a high voltage conductor 27 so that it is electrically connected with the winding end 412 of the secondary coil 4 on the high voltage side L1 of the secondary bobbin 42.

Next, the secondary bobbin assembly 14 is placed around the primary bobbin assembly 13, and the low voltage winding end 411 of the secondary coil 4 of the secondary bobbin assembly 14 is attached to the connection end 231B of the connection part 22 of the primary bobbin 2 via the diode 25. Then, as shown in FIGS. 8, 9, and 17, the outer core 53 and the igniter 51 are relatively placed from the deeper side H1 in the height direction H with respect to the primary bobbin assembly 13. The terminals 511 of the igniter 51 are connected to the terminals 241, 242, 243, 244 of the connector part 24 of the primary bobbin 2 of the primary bobbin assembly 13. The coil assembly 10 is thus fabricated.

Next, the connector part 24 of the primary bobbin 2 of the coil assembly 10 is placed in a cutout part 541 of the coil case 54, and the coil assembly 10 is housed in the coil case 54. At this time, a high voltage conductor 28 may be placed at the part of the coil case 54 that forms the tower part 12. Next, as shown in FIG. 1, the gaps K formed by placing the coil assembly 10 in the coil case 54 are filled with the filler 55 made of a thermosetting resin such as an epoxy resin. The coil assembly 10 and the coil case 54 are thus integrated, and the ignition coil 1 is obtained.

(Operations and Effects)

In the ignition coil 1 of the present embodiment, the positions and orientations of the firstly-wound ends 311, 312 of the primary main coil 3A and the secondly-wound ends 321, 322 of the primary sub coil 3B at and in which they are attached to the connection part 22 of the primary bobbin 2 are thought out carefully. Specifically, the primary main coil 3A including the innermost coil part in the winding cylinder part 21 of the primary bobbin 2 is provided as a firstly-wound coil wound around the primary bobbin 2 first, and the primary sub coil 3B is provided as a secondly-wound coil wound around the primary bobbin 2 subsequently.

In addition, in the ignition coil 1, the shortest distance r1 from the central axis O of the winding cylinder part 21 to each firstly-wound end 311, 312 of the primary main coil 3A is smaller than the shortest distance r2 from the central axis O of the winding cylinder part 21 to each secondly-wound end 321, 322 of the primary sub coil 3B. In other words, in the ignition coil 1 of the present embodiment, the firstly-wound ends 311, 312 of the primary main coil 3A are placed inside the secondly-wound ends 321, 322 of the primary sub coil 3B in the radial direction R of the primary bobbin 2.

The firstly-wound ends 311, 312 of the primary main coil 3A and the secondly-wound ends 321, 322 of the primary sub coil 3B are pulled out from the winding cylinder part 21 of the primary bobbin 2 to opposite sides of the connection part 22 in the lateral direction W. At this time, in order to properly handle and attach the firstly-wound ends 311, 312 of the primary main coil 3A and the secondly-wound ends 321, 322 of the primary sub coil 3B, it is important to avoid interference between the firstly-wound ends 311, 312 and the secondly-wound ends 321, 322. It is also important that the firstly-wound ends 311, 312 attached to the connection ends 231A of the connection part 22 of the primary bobbin 2 first do not hinder handling and attachment of the secondly-wound ends 321, 322 attached to the connection ends 231A of the connection part 22 of the primary bobbin 2 afterwards.

Therefore, in the ignition coil 1 of the present embodiment, the firstly-wound ends 311, 312 of the primary main coil 3A are attached to the connection ends 231A positioned closer to the central axis O at the inner side of the connection part 22 of the primary bobbin 2. At the connection part 22 of the primary bobbin 2, the secondly-wound ends 321, 322 of the primary sub coil 3B are attached to the connection ends 231A positioned at the outer side further from the central axis O as compared with the connection ends 231A to which the firstly-wound ends 311, 312 are attached. The firstly-wound ends 311, 312 of the primary main coil 3A are placed inside the secondly-wound ends 321, 322 of the primary sub coil 3B in the radial direction R of the primary bobbin 2.

Accordingly, after the firstly-wound ends 311, 312 of the primary main coil 3A as the firstly-wound coil are attached to the connection ends 231A of the connection part 22 of the primary bobbin 2, when the secondly-wound ends 321, 322 of the primary sub coil 3B as the secondly-wound coil are attached to the connection ends 231A of the connection part 22 of the primary bobbin 2, the firstly-wound ends 311, 312 and the secondly-wound ends 321, 322 do not cross each other. Further, it is possible to prevent the secondly-wound ends 321, 322 from interfering with the firstly-wound ends 311, 312 and the connection ends 231A to which the firstly-wound ends 311, 312 are attached. The firstly-wound ends 311, 312 and the connection ends 231A to which the firstly-wound ends 311, 312 are attached do not hinder handling and attachment of the secondly-wound ends 321, 322.

Further, as described above, the grooves 232 in the connection ends 231A of all the connection terminals 23A of the present embodiment are open toward the opening side H2 in the height direction H. All of the connection terminals 23A are placed between the assembly of the primary main coil 3A and the primary sub coil 3B and the connector part 24. Therefore, the firstly-wound ends 311, 312 and the secondly-wound ends 321, 322 can be easily routed and attached to the grooves 232 of the connection terminals 23A.

Thus, according to the ignition coil 1 of the present embodiment, the routing and attachment of the firstly-wound ends 311, 312 of the primary main coil 3A and the secondly-wound ends 321, 322 of the primary sub coil 3B to the connection part 22 of the primary bobbin 2 can be facilitated.

Second Embodiment

Figure 18:
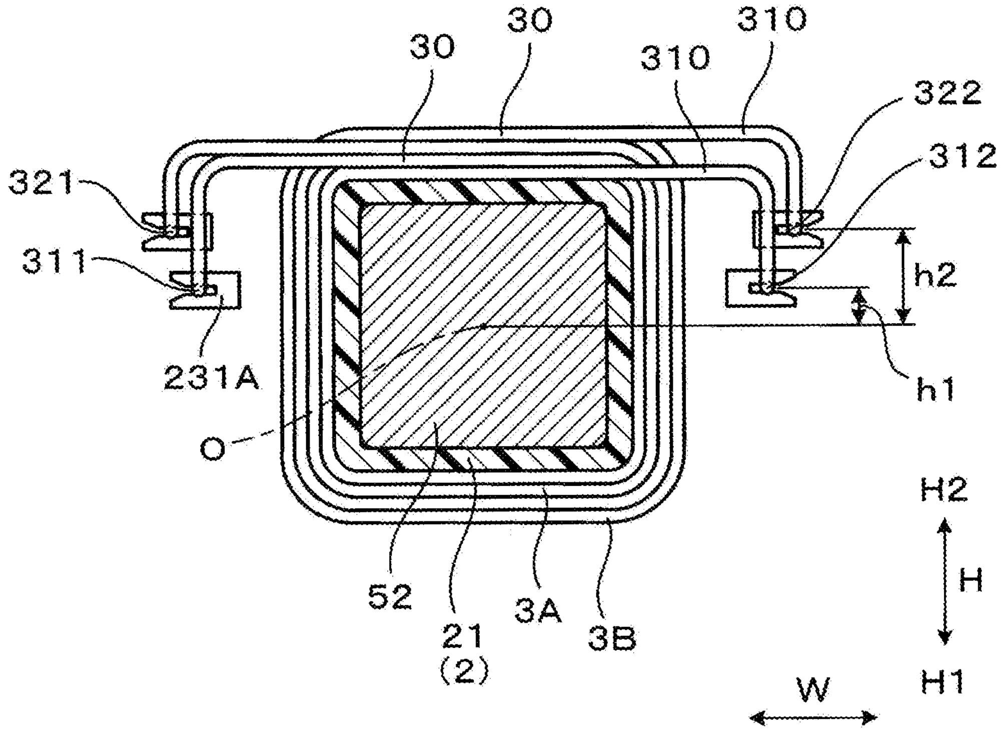
FIG. 18 is an explanatory view schematically showing positions of the ends of the primary main coil and the primary sub coil with respect to the central axis of the winding cylinder part according to a second embodiment.

The present embodiment presents an ignition coil 1 in which the positions of the firstly-wound ends 311, 312 of the primary main coil 3A and the secondly-wound ends 321, 322 of the primary sub coil 3B at which they are attached to the connection part 22 of the primary bobbin 2 differ from those of the first embodiment. In this embodiment, as shown in FIG. 18, the position of each firstly-wound end 311, 312 in the height direction H differs from the position of each secondly-wound end 321, 322 in the height direction H. More specifically, the firstly-wound ends 311, 312 and the secondly-wound ends 321, 322 are shifted towards the opening side H2 in the height direction H with respect to the central axis O of the winding cylinder part 21, and further, the firstly-wound ends 311, 312 of the primary main coil 3A as the firstly-wound coil are on the deeper side H1 in the height direction H with respect to the secondly-wound ends 321, 322 of the primary sub coil 3B as the secondly-wound coil, in other words, on the inner side in the radial direction R.

The grooves 232 in the connection ends 231A of the connection part 22 of the primary bobbin 2 of the present embodiment are open toward the outer side in the lateral direction W. In other words, the groove 232 of each connection end 231A is cut from the outer side toward the inner side in the lateral direction W. The firstly-wound ends 311, 312 of the primary main coil 3A and the secondly-wound ends 321, 322 of the primary sub coil 3B are slid into the grooves 232 of the connection ends 231A from the outer side toward the inner side in the lateral direction W. On the inner side in the lateral direction W of each connection end 231A into which a firstly-wound end 311, 312 or secondly-wound end 321, 322 is slid, a space for placing the receiving jig part 82 of the attaching jig 8 is formed.

As with the first embodiment, the firstly-wound ends 311, 312 and the secondly-wound ends 321, 322 are each placed on opposite sides of the central axis O of the winding cylinder part 21, side by side in the lateral direction W. In addition, the firstly-wound ends 311, 312 and the secondly-wound ends 321, 322 are offset to the opening side H2 in the height direction H from the central axis O of the winding cylinder part 21. In other words, the firstly-wound ends 311, 312 and the secondly-wound ends 321, 322 are offset to the opening side H2 in the height direction H from a plane that is parallel to the lateral direction W and includes the central axis O of the winding cylinder part 21. The firstly-wound ends 311, 312 and the secondly-wound ends 321, 322 are attached to the connection ends 231A of the connection terminals 23A provided in the connection part 22.

When the direction in which the grooves 232 of the connection ends 231A are formed is directed in the lateral direction W, the connection ends 231A into which each firstly-wound end 311, 312 and each firstly-wound end 311, 312 are attached and the connection ends 231A into which each secondly-wound end 321, 322 and each secondly-wound end 321, 322 are attached are offset from each other in the height direction W. In other words, the distance h1 of the component in the height direction H from the central axis O of the winding cylinder part 21 to the wire center of each firstly-wound end 311, 312 is smaller than the distance h2 of the component in the height direction H from the central axis O of the winding cylinder part 21 to the wire center of each secondly-wound end 321, 322. The connection ends 231A to which the firstly-wound ends 311, 312 are attached and the connection ends 231A to which the secondly-wound ends 321, 322 are attached are offset from each other in the height direction H. Note that the distances h1 and h2 are shown as distances in the height direction H from a plane parallel to the lateral direction W and including the central axis O to the firstly-wound coil ends 311, 312 or the secondly-wound coil ends 321, 322. The distances h1 and h2 can also be referred to as height direction distances h1 and h2.

When the direction in which the grooves 232 of the connection ends 231A are formed is directed in the lateral direction W, since the firstly-wound ends 311, 312 and the secondly-wound ends 321, 322 are offset from each other at least in the height direction H, when the firstly-wound ends 311, 312 or the secondly-wound ends 321, 322 are slid into the grooves 232 of the connection ends231A by the attaching jig 8, it is possible to prevent the jig 8 from interfering with any of the firstly-wound ends 311, 312, the secondly-wound ends 321, 322, and the connection ends 231A. The same effect can be obtained when the connection ends 231A to which the firstly-wound ends 311, 312 are attached and the connection ends 231A to which the secondly-wound ends 321, 322 are attached are offset in the height direction H.

The firstly-wound ends 311, 312 and the secondly-wound ends 321, 322 may be offset not only in the height direction H but also in at least one of the axial direction L and the lateral direction W. In this case, since the firstly-wound ends 311, 312 and the secondly-wound ends 321, 322 are offset in at least one of the axial direction L and the lateral direction W, it is possible to prevent the interference between the firstly-wound ends 311, 312, the secondly-wound ends 321, 322 or the connection ends 231A and the attaching jig 8 even more appropriately. The same effect can be obtained when the connection ends 231A to which the firstly-wound ends 311, 312 are attached and the connection ends 231A to which the secondly-wound ends 321, 322 are attached are offset in at least one of the axial direction L and the lateral direction W.

The rest of the configuration, the operations and effects, and the like of the ignition coil 1 of the present embodiment are the same as or similar to those of the first embodiment. The constituent elements of the ignition coil 1 according to the present embodiment indicated by the same reference signs as those of the first embodiment are the same as or similar to those of the first embodiment.

Third Embodiment

Figure 19:
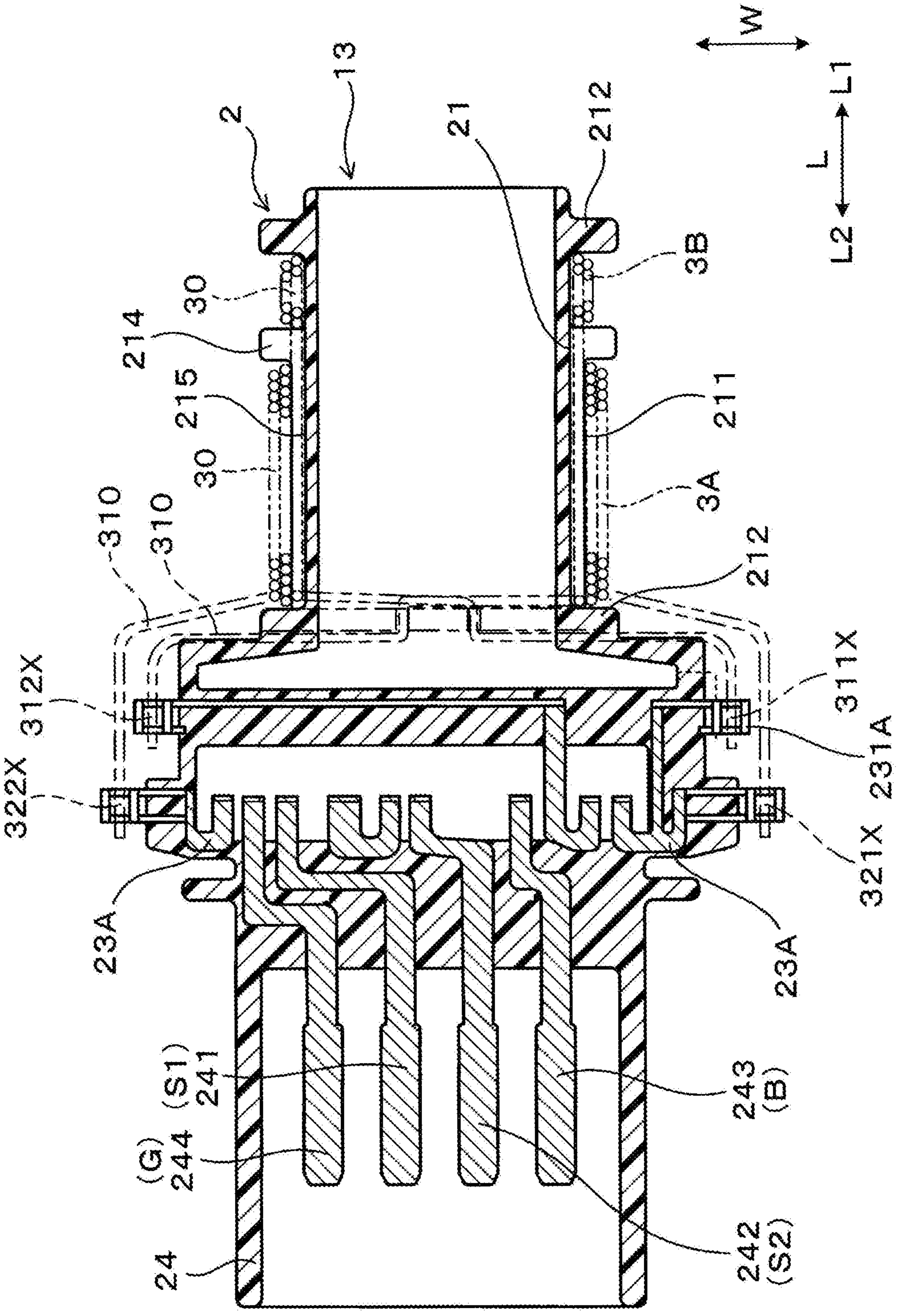
FIG. 19 is an explanatory view showing a cross section of the primary bobbin with the primary coil according to a third embodiment.
Figure 20:
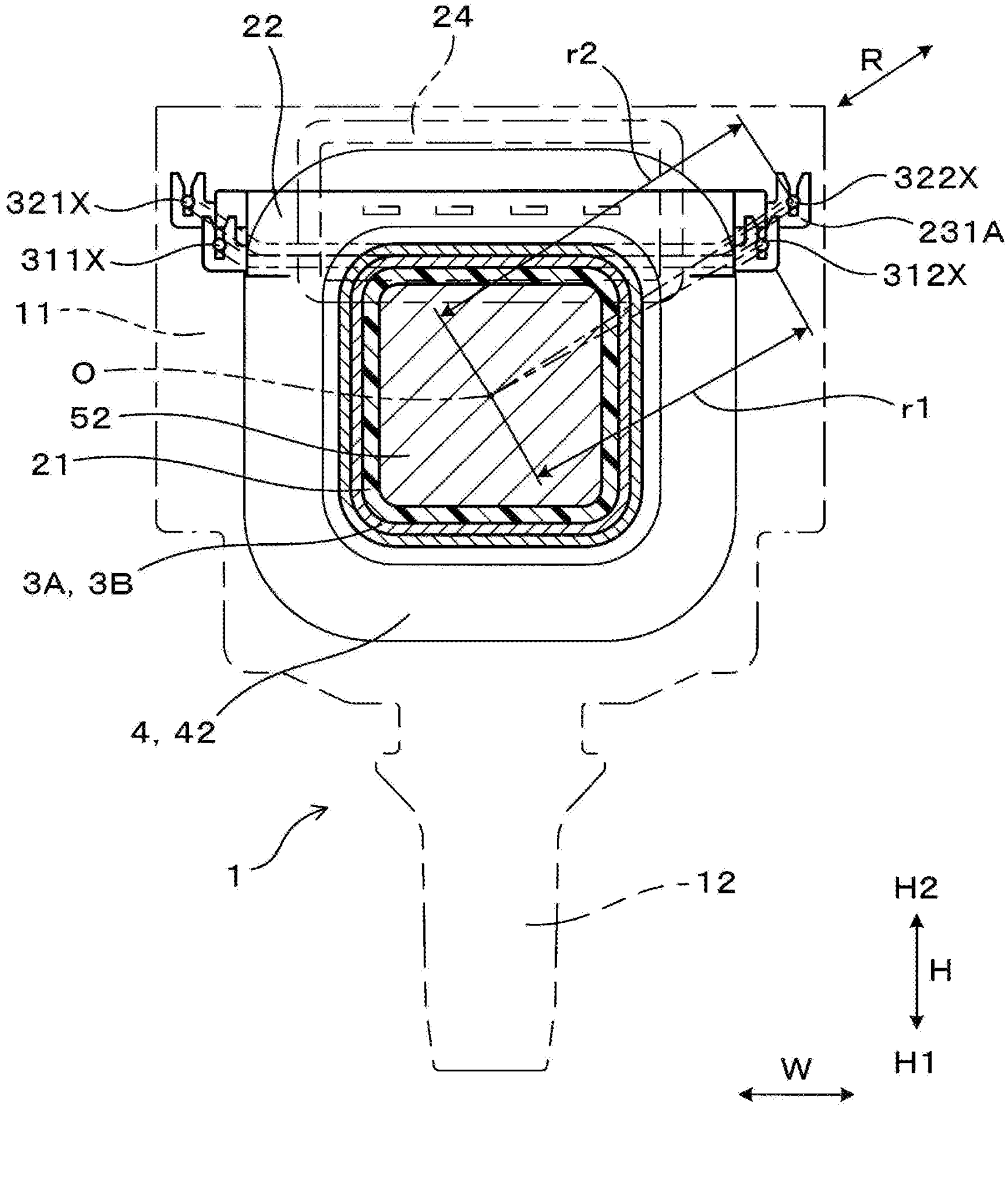
FIG. 20 is an explanatory view schematically showing positions of the ends of the primary main coil and the primary sub coil with respect to the central axis of the winding cylinder part according to a third embodiment in a cross section of the ignition coil.

The present embodiment presents an ignition coil 1 in which the positions of the primary main coil 3A and the primary sub coil 3B with respect to the primary bobbin 2 are changed from those of the first embodiment. In the present embodiment, as shown in FIGS. 19 and 20, the winding part 30 of the primary main coil 3A is only wound around a section of the outer surface of the winding cylinder part 21 of the primary bobbin 2 on the low voltage side L2 in the axial direction L. The winding part 30 of the primary sub coil 3B is wound around a section of the outer surface of the winding cylinder part 21 of the primary bobbin 2 on the high voltage side L1 of the primary main coil 3A in the axial direction L.

Further, a middle collar part 214 is provided on the outer surface of the winding cylinder part 21 of the primary bobbin 2 between the collar parts 212 at the ends in the axial direction L to separate the section in the axial direction L in which the primary main coil 3A is wound from the section in the axial direction L in which the primary sub coil 3B is wound. The middle collar part 214 has a diameter that is larger than the outer diameter of the annular recess part 211.

Further, as shown in FIGS. 19 and 20, in the present embodiment, the primary sub coil 3B forms the firstly-wound coil wound around the primary bobbin 2 first, and the primary main coil 3A forms the secondly-wound coil wound around the primary bobbin 2 afterwards. The shortest distance r1 from the central axis O of the winding cylinder part 21 to the wire center of each firstly-wound end 311X, 312X of the primary sub coil 3B is smaller than the shortest distance r2 from the central axis O of the winding cylinder part 21 to the wire center of each secondly-wound end 321X, 322X of the primary main coil 3A.

Grooves 215 are formed in the outer surface of the winding cylinder part 21 of the primary bobbin 2, the collar part 212 on the low voltage side L2 in the axial direction L, and the middle collar part 214 in which each lead part 310 of the primary sub coil 3B is placed along the axial direction L. Each lead part 310 of the primary sub coil 3B passes through the inner side of the primary main coil 3A inside the grooves 215 so that it is pulled out to the connection end 231A of the connection part 22.

The innermost coil part around the winding cylinder part 21 of the primary bobbin 2 for distinguishing the firstly-wound coil from the secondly-wound coil in the present embodiment is the lead parts 310 of the primary sub coil 3B placed in the grooves 215.

Further, in the present embodiment, the winding height of the primary sub coil 3B in the radial direction R is smaller than the winding height of the primary main coil 3A in the radial direction R. The insulation distance in the radial direction R between the primary sub coil 3B and the high voltage side L1 part of the secondary coil 4 can be maximized. As a result, the high voltage durability of the ignition coil 1 can be improved.

The permanent magnet 521 is placed between the end face of the central core 52 on the low voltage side L2 in the axial direction L and the inner surface of the outer core 53, and the primary main coil 3A is positioned on the low voltage side L2 in the axial direction L, which is the side on which the permanent magnet 521 is placed. In the closed magnetic path formed by the central core 52 and the outer core 53, in the axial direction L, the magnetic flux density in the part near the permanent magnet 521 is higher than the magnetic flux density in the rest of the path around that part. Therefore, the inductance of the primary main coil 3A can be further increased by placing the primary main coil 3A close to the permanent magnet 521. This improves the generated voltage performance of the secondary coil 4.

Figure 21:
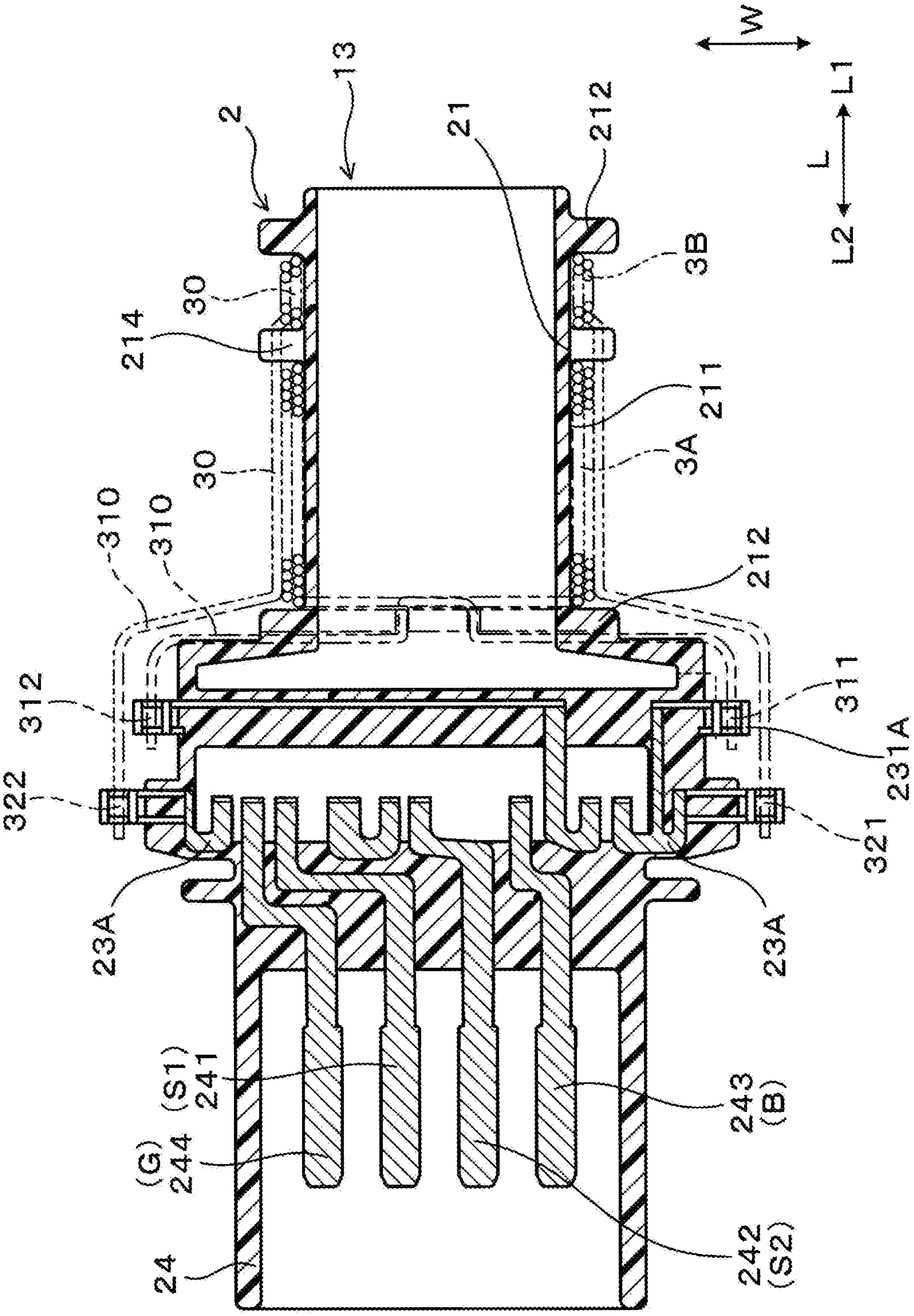
FIG. 21 is an explanatory view showing a cross section of the primary bobbin with the primary coil according to a fourth embodiment.
Figure 22:
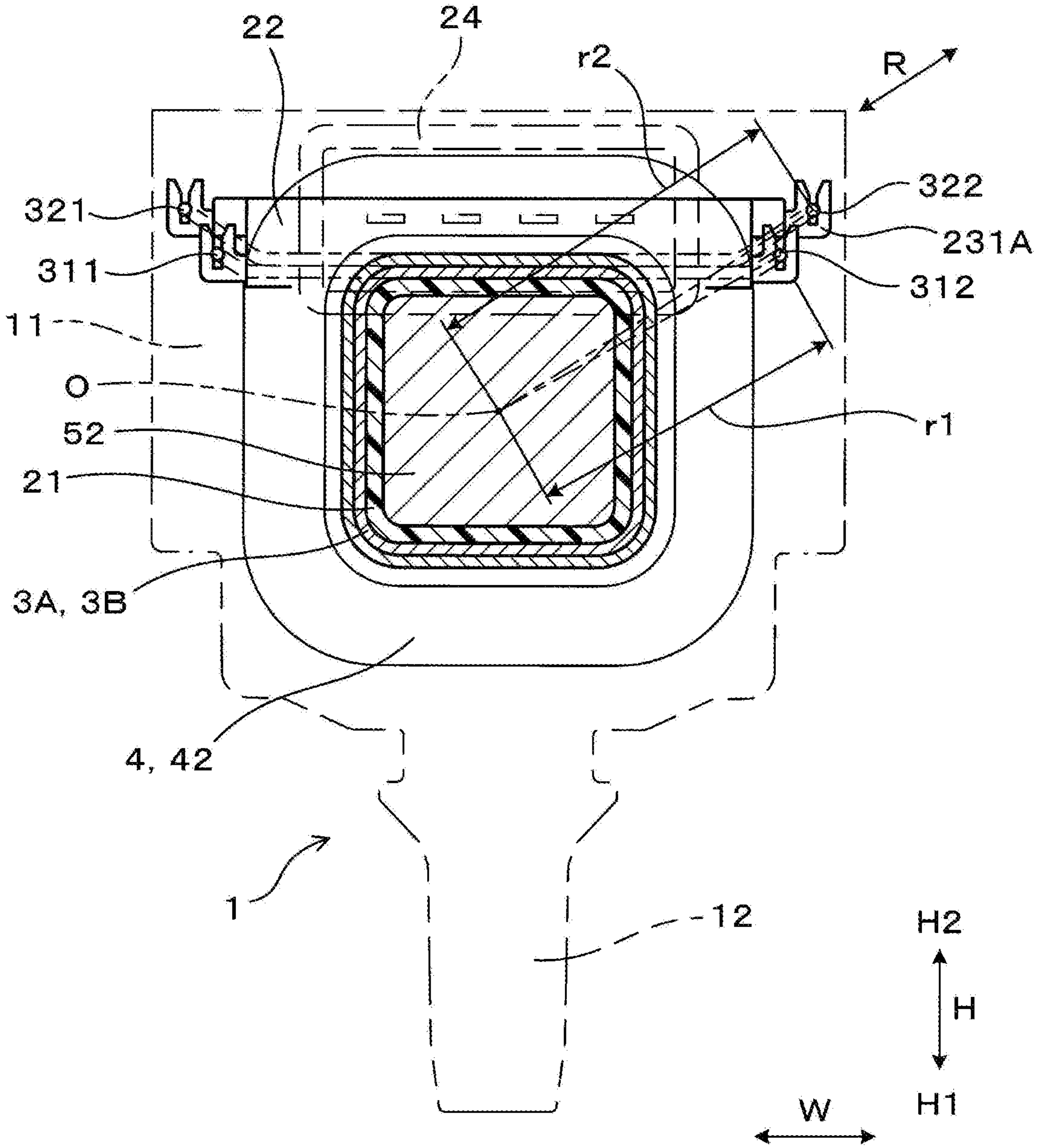
FIG. 22 is an explanatory view schematically showing positions of the ends of the primary main coil and the primary sub coil with respect to the central axis of the winding cylinder part according to the fourth embodiment in a cross section of the ignition coil.

As shown in FIGS. 21 and 22, in a configuration in which the primary sub coil 3B is placed on the high voltage side L1 of the primary main coil 3A in the axial direction L, the primary main coil 3A may form the firstly-wound coil wound around the primary bobbin 2 first, and the primary sub coil 3B may form the secondly-wound coil wound around the primary bobbin 2 afterwards. In this case, the pair of lead parts 310 of the primary sub coil 3B are arranged parallel to the axial direction L on the outer side of the primary main coil 3A to bring and attach the secondly-wound ends 321, 322 of the lead parts 310 to the connection ends 231A of the connection terminals 23A of the connection part 22. The shortest distance r1 from the central axis O of the winding cylinder part 21 to the wire center of each firstly-wound end 311, 312 of the primary main coil 3A is smaller than the shortest distance r2 from the central axis O of the winding cylinder part 21 to the wire center of each secondly-wound end 321, 322 of the primary sub coil 3B.

In this case, the innermost coil part around the winding cylinder part 21 of the primary bobbin 2 is included in both the winding part 30 of the primary main coil 3A and the winding part 30 of the primary sub coil 3B. Therefore, in this case, since the pair of lead parts 310 of the primary sub coil 3B are arranged parallel to the axial direction L on the outer side of the winding part 30 of the primary main coil 3A in the radial direction R, it is judged that the primary main coil 3A which is located on the low voltage side L2 of the primary bobbin 2 in the axial direction L is the firstly-wound coil.

In the present embodiment, the positions at which the secondly wound ends 321, 322 of the primary sub coil 3B (the firstly-wound coil) wound around the high voltage side L1 part of the outer surface of the winding cylinder part 21 of the primary bobbin 2 in the axial direction L are pulled out to the connection part 22 of the bobbin 2 are thought out carefully so that interference between the secondly-wound ends 321, 322 of the primary sub coil 3B and the firstly-wound ends 311, 312 of the primary main coil 3A can be avoided.

The rest of the configuration, the operations and effects, and the like of the ignition coil 1 of the present embodiment are the same as or similar to those of the first and second embodiments. The constituent elements of the ignition coil 1 according to the present embodiment indicated by the same reference signs as those of the first and/or second embodiments are the same as or similar to those of the first and/or second embodiments.

Fourth Embodiment

The embodiment presents various modes of ignition coils 1 that are different from those of the first to third embodiments.

Figure 23:
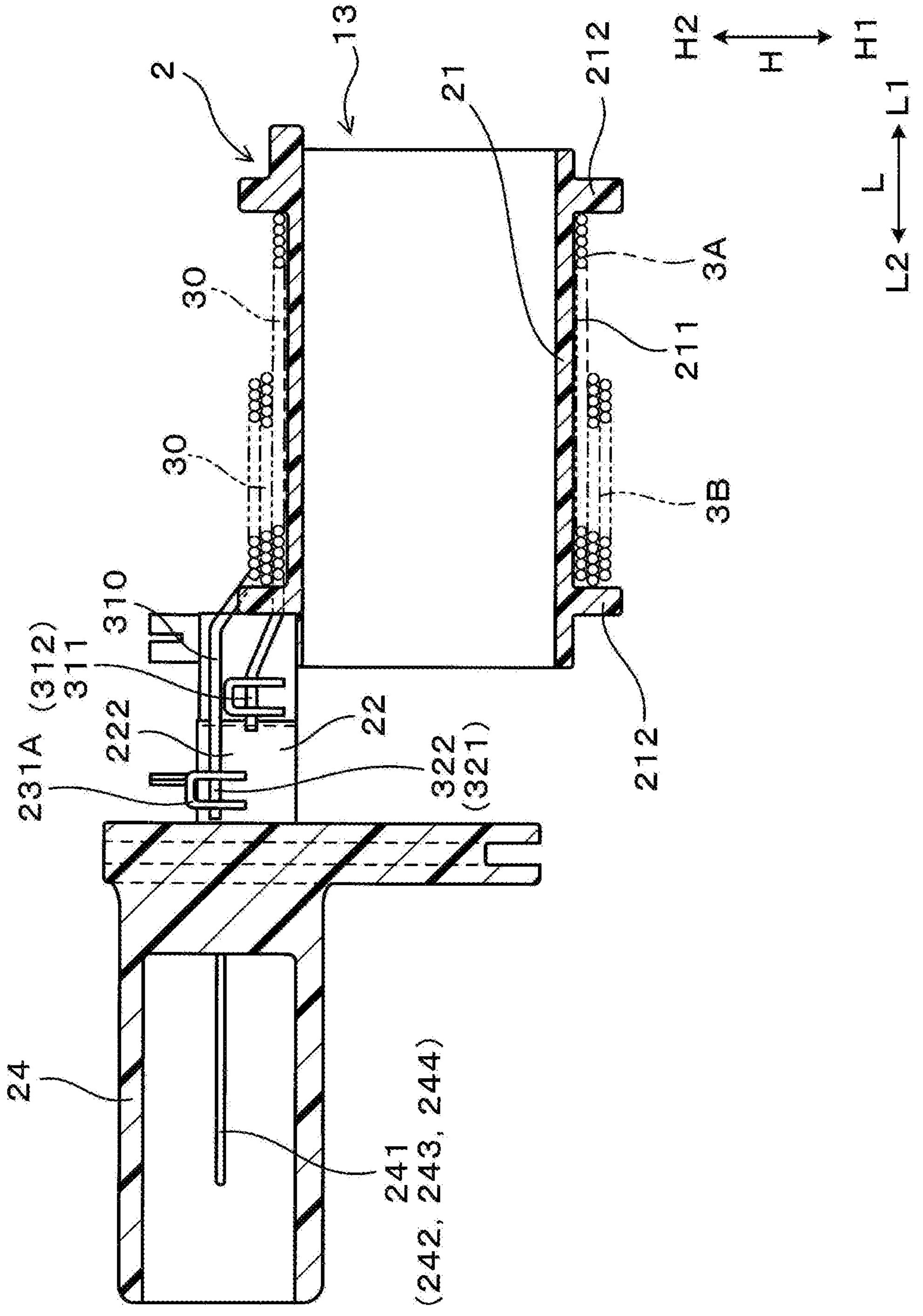
FIG. 23 is an explanatory view showing a cross section of another primary bobbin with the primary coil according to the fourth embodiment.
Figure 24:
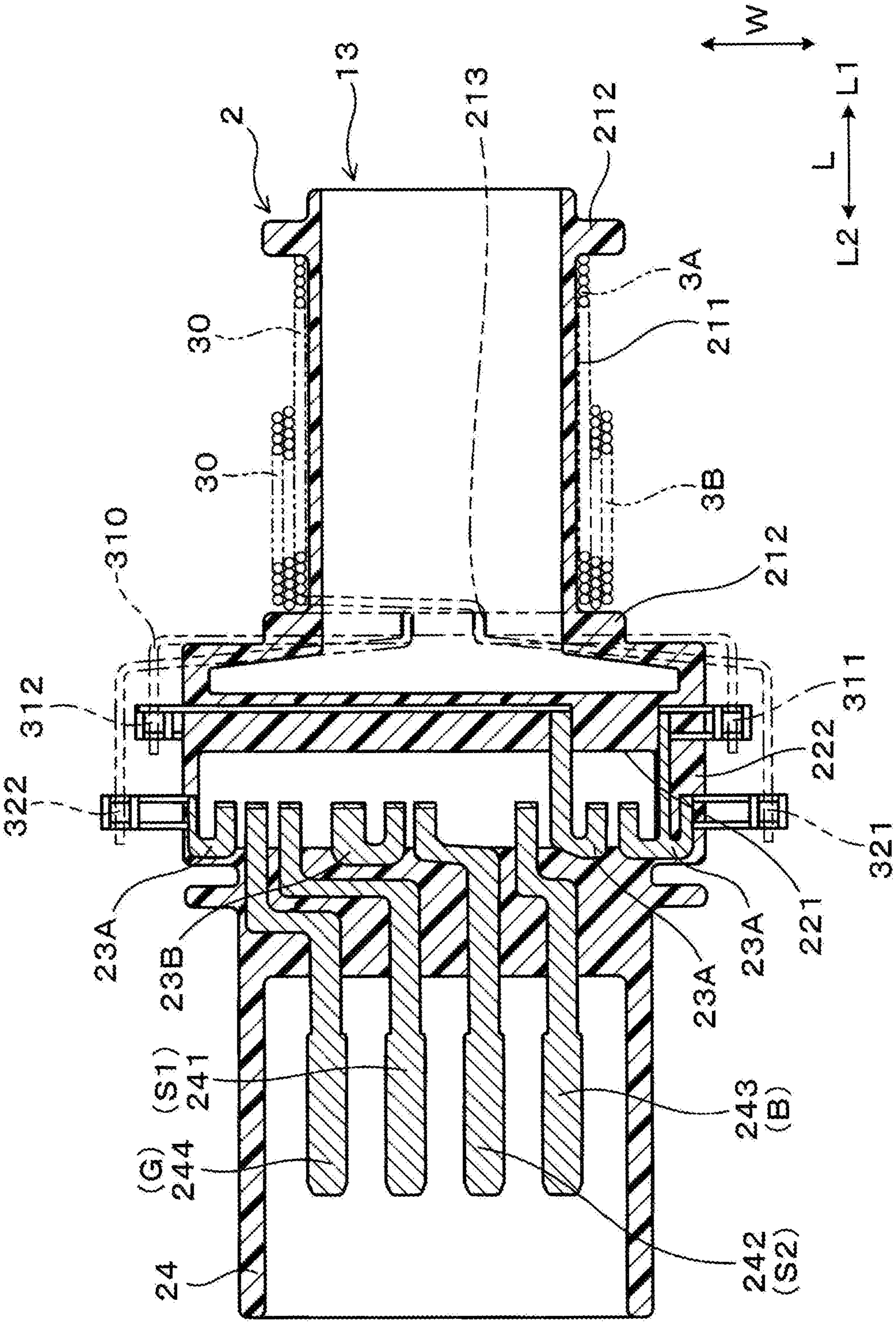
FIG. 24 is an explanatory view showing a cross section of another primary bobbin with the primary coil according to the fourth embodiment.

In the ignition coil 1 of the first embodiment, the firstly-wound ends 311, 312 of the primary main coil 3A as the firstly-wound coil are positioned on the low voltage side L2 of the secondly-wound ends 321, 322 of the primary sub coil 3B as the secondly-wound coil in the axial direction L. Alternatively, as shown in FIGS. 23 and 24, the firstly-wound ends 311, 312 of the primary main coil 3A as the firstly-wound coil may be positioned on the high voltage side L1 of the secondly-wound ends 321, 322 of the primary sub coil 3B as the secondly-wound coil in the axial direction L.

As long as the generated voltage performance of the secondary coil 4 can be ensured, the wire diameter of the primary main coil 3A and the wire diameter of the primary sub coil 3B may either be the same or different. When the wire diameter of the primary main coil 3A and the wire diameter of the primary sub coil 3B are the same, the primary main coil 3A and the primary sub coil 3B can be wound continuously.

The primary main coil 3A and the primary sub coil 3B may be formed using a self-bonding copper wire which can be wound without the primary bobbin 2. In this case, the primary bobbin 2 can be omitted, and the primary main coil 3A and the primary sub coil 3B are placed on the outer side of the central core 52. Further, in this case, the connection ends 231A of the connection terminals 23A to which the ends of the primary main coil 3A and the ends of the primary sub coil 3B are connected may be integrated with the connector part 24.

As long as the generated voltage performance of the secondary coil 4 can be ensured, the permanent magnet 521 placed between the central core 52 and the outer core 53 can be omitted.

The rest of the configuration, the operations and effects, and the like of the ignition coil 1 of the present embodiment are the same as or similar to those of the first and third embodiments. The constituent elements of the ignition coil 1 according to the present embodiment indicated by the same reference signs as those of the first to third embodiments are the same as or similar to those of the first to third embodiments.

The present disclosure is not limited only to the embodiments, and other embodiments can be implemented without deviating from the gist thereof. The present disclosure also encompasses various variations, and variations within the scope of equivalence. Further, various combinations, modes, and the like of components that can be expected from the present disclosure are also included in the technical idea of the present disclosure.

As an aspect of the present disclosure, an ignition coil (1) for an internal combustion engine is provided. The ignition coil includes:

- a primary bobbin (2) made of an insulating material and including a winding cylinder part (21) and a connection part (22) connected to the winding cylinder part and positioned between the winding cylinder part and a connector part (24);
- a primary coil (3A, 3B) including a primary main coil (3A) and a primary sub coil (3B) separately wound around the winding cylinder part; and
- a secondary coil (4) that is concentric with the primary coil.

When one of the primary main coil and the primary sub coil that includes an innermost coil part around the winding cylinder part is defined as a firstly-wound coil and the other is defined as a secondly-wound coil,

- firstly-wound ends (311, 312), which are a pair of ends of the firstly-wound coil, and secondly-wound ends (321, 322), which are a pair of ends of the secondly-wound coil, are attached to the connection part, and
- a shortest distance (r1) from a central axis (O) of the winding cylinder part to each of the firstly-wound ends is smaller than a shortest distance (r2) from the central axis of the winding cylinder part to each of the secondly-wound ends.

In the ignition coil for an internal combustion engine of the above aspect, the positions at which the two pairs of ends of the primary main coil and the primary sub coil, which constitute the primary coil, are attached to the connection part of the primary bobbin are thought out carefully. Specifically, one of the primary main coil and the primary sub coil that includes the innermost coil part around the winding cylinder part of the primary bobbin is defined as a firstly-wound coil, and the other is defined as a secondly-wound coil. The coil that has been wound around the primary bobbin first, i.e., the firstly-wound coil can be identified based on whether the coil includes the innermost coil part of the entire primary coil.

In the ignition coil for an internal combustion engine, the shortest distance from the central axis of the winding cylinder part to each of the firstly-wound ends is smaller than the shortest distance from the central axis of the winding cylinder part to each of the secondly-wound ends. In other words, in the ignition coil for an internal combustion engine, the firstly-wound ends of the firstly-wound coil are placed inside the secondly-wound ends of the secondly-wound coil in the radial direction of the primary bobbin.

Accordingly, when the secondly-wound ends of the secondly-wound coil are attached to the connection part of the primary bobbin after the firstly-wound ends of the firstly-wound coil have been attached to the connection part of the primary bobbin, the firstly-wound ends and the secondly-wound ends do not cross each other. In addition, the firstly-wound ends do not hinder attachment of the secondly-wound ends.

Thus, according to the ignition coil for an internal combustion engine of the above aspect, attachment of the ends of the primary main coil and the ends of the primary sub coil to the connection part of the primary bobbin can be facilitated.

The "connector part" refers to a part for connecting components such as the primary coil to the outside of the ignition coil for an internal combustion engine. The "central axis of the winding cylinder part" refers to an imaginary line passing through the centroid of each of the cross sections of the different parts of the winding cylinder part in the axial direction. In other words, the "central axis of the winding cylinder part" refers to the center of the winding of the primary coil. The "shortest distance" refers to the distance from the central axis in the radial direction of the winding cylinder part in a cross section orthogonal to the axial direction of the winding cylinder part. In other words, it refers to a distance corresponding to a radius. The shape of the winding cylinder part may be a rectangular tube, a cylinder, or any other appropriate shape.

"Separately wound around the winding cylinder part" means that, in a state where the primary main coil and the primary sub coil have been wound around the winding cylinder part, the wires (for example, magnet wires) forming these coils are separated in the middle. When the wire diameter of the primary main coil and the wire diameter of the primary sub coil are the same, the primary main coil and the primary sub coil can be wound continuously around the winding cylinder part and cut into two afterwards.

What is claimed is:

1. An attaching jig used when sliding a firstly-wound end of a primary main coil and a secondly-wound end of a primary sub coil into a groove of a connection end of a connection terminal in a primary bobbin, comprising:

- a holding jig member configured to hold the firstly-wound end or the secondly-wound end;
- a receiving jig member configured to face the holding jig member and receive the force applied by the holding jig member to slide the firstly-wound end or the secondly-wound end into the groove.

* * * * *